US006588268B1

(12) United States Patent
Yamagishi et al.

(10) Patent No.: US 6,588,268 B1
(45) Date of Patent: *Jul. 8, 2003

(54) FLOW RATE SENSOR, TEMPERATURE SENSOR AND FLOW RATE DETECTING APPARATUS

(75) Inventors: Kiyoshi Yamagishi, Saitama (JP); Toshiaki Kawanishi, Saitama (JP); Kenji Tomonari, Saitama (JP); Shinichi Inoue, Saitama (JP); Atsushi Koike, Saitama (JP)

(73) Assignee: Mitsui Mining & Smelting Co. Ltd., Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 09/554,917

(22) PCT Filed: Nov. 19, 1998

(86) PCT No.: PCT/JP98/05207

§ 371 (c)(1),
(2), (4) Date: May 22, 2000

(87) PCT Pub. No.: WO99/27327

PCT Pub. Date: Jun. 3, 1999

(30) Foreign Application Priority Data

| Nov. 21, 1997 | (JP) | 9-321034 |
| Mar. 26, 1998 | (JP) | 10-79851 |
| Mar. 26, 1998 | (JP) | 10-79852 |
| Nov. 10, 1998 | (JP) | 10-318540 |
| Nov. 11, 1998 | (JP) | 10-320210 |

(51) Int. Cl.$^7$ .................... G01F 1/68
(52) U.S. Cl. .................... 73/204.26
(58) Field of Search .............. 73/204.12, 204.13, 73/204.15, 204.22, 204.23, 204.26; 374/44, 43

(56) References Cited

U.S. PATENT DOCUMENTS

| 4,264,961 A | 4/1981 | Nishimura et al. | 364/510 |
| 4,677,850 A | 7/1987 | Miura et al. | 73/204 |

(List continued on next page.)

FOREIGN PATENT DOCUMENTS

| GB | 1098077 | 1/1968 |
| JP | 0 121 0698 | 8/1989 |
| JP | 0 130 1120 | 12/1989 |
| JP | 0 814 5751 | 6/1996 |
| JP | 8-145751 A | * 6/1996 |
| JP | 0 814 6026 | 6/1996 |
| JP | 8-146026 A | * 6/1996 |

OTHER PUBLICATIONS

Supplementary Partial European Search Report dated Jan. 20, 2003 in EP 98 95 4745.

*Primary Examiner*—Hezron Williams
*Assistant Examiner*—Corey D. Mack
(74) *Attorney, Agent, or Firm*—Baker & Daniels

(57) ABSTRACT

A flow rate sensor for performing a flow rate detection of fluid with high accuracy without suffering adverse effect of the environmental temperature condition even when the fluid is viscous fluid having relatively high viscosity or the flow rate is relatively small is provided. The flow rate sensor includes a flow rate detector having a heating function and a temperature sensing function, and a pipe line for fluid to be detected which is formed so that heat from the flow rate detector is transferred to and absorbed by the fluid. The temperature sensing which is affected by a heat absorption effect of the fluid due to the heat is executed in the flow rate detector, and the flow rate of the fluid in the pipe line is detected on the basis of the temperature sensing result. Unit retaining portions formed on a casing in which the pipe line is formed, the unit retaining portions being disposed adjacent to the pipe line. A flow rate detecting unit comprising the flow rate detector is retained by the unit retaining portion, and a temperature detecting unit comprising a fluid temperature detector is retained by the unit retaining portion.

55 Claims, 23 Drawing Sheets

U.S. PATENT DOCUMENTS

| | | | |
|---|---|---|---|
| 4,761,995 A | 8/1988 | Ohta et al. ................. | 73/118.2 |
| 4,912,975 A * | 4/1990 | Ohta et al. ............... | 73/204.26 |
| 5,351,536 A * | 10/1994 | Uchiyama ................ | 73/204.26 |
| 5,443,550 A | 8/1995 | Yoneda et al. ............. | 73/118.2 |
| 5,533,412 A * | 7/1996 | Jerman et al. ........... | 73/861.95 |
| 5,688,049 A * | 11/1997 | Govorkov ................... | 374/44 |
| 6,079,264 A * | 6/2000 | Yamakawa et al. ...... | 73/204.22 |

* cited by examiner

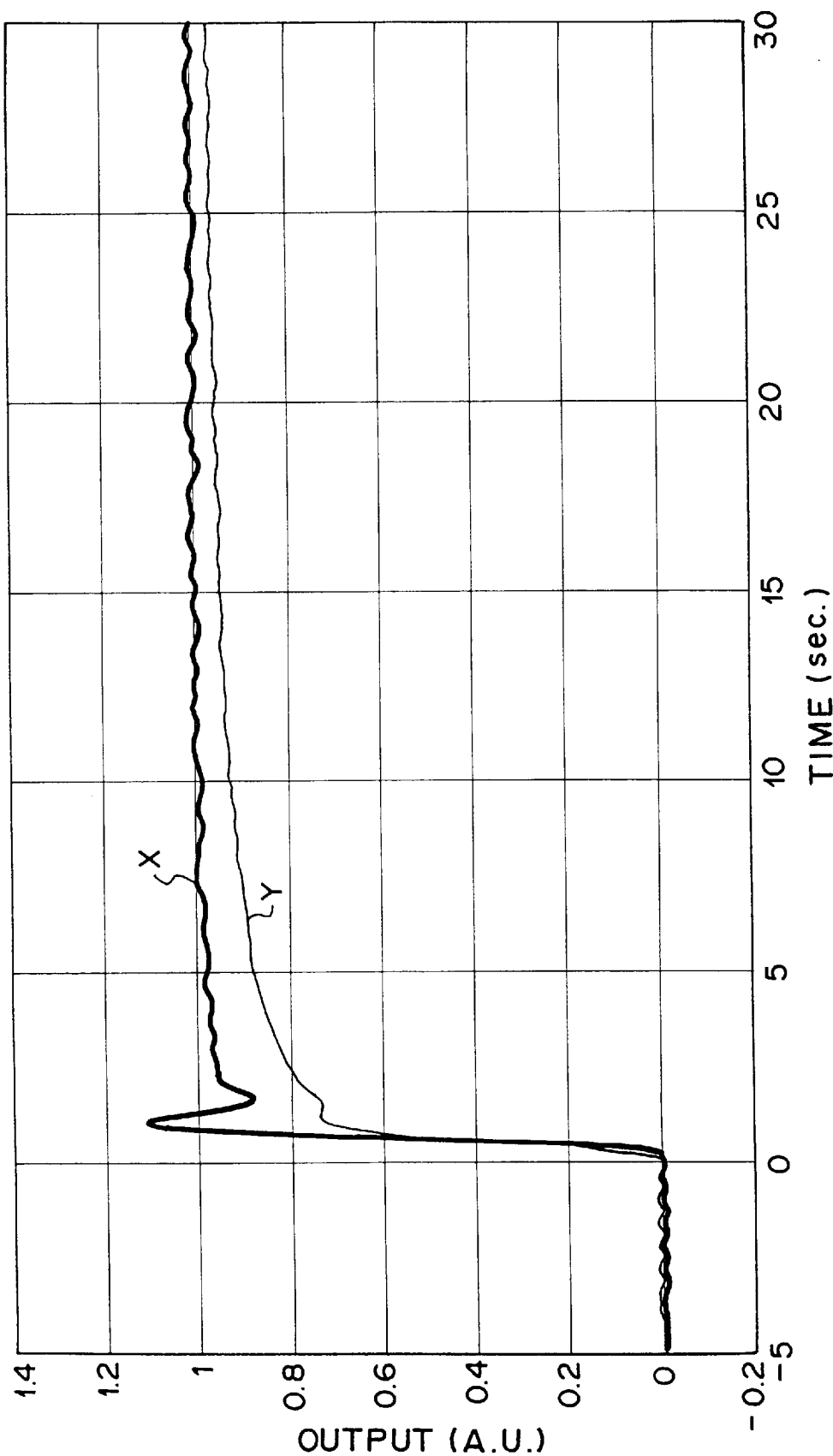

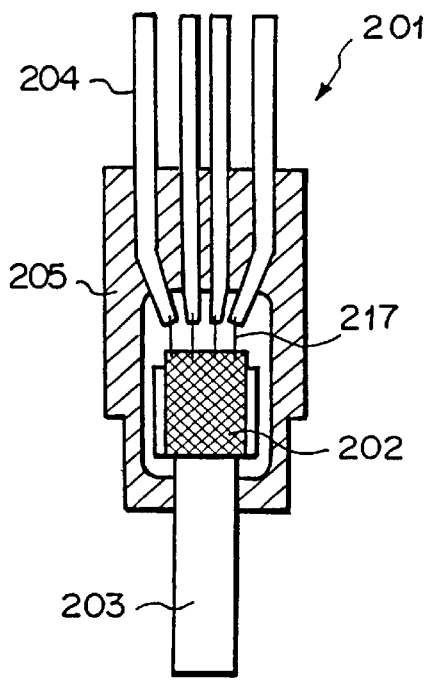
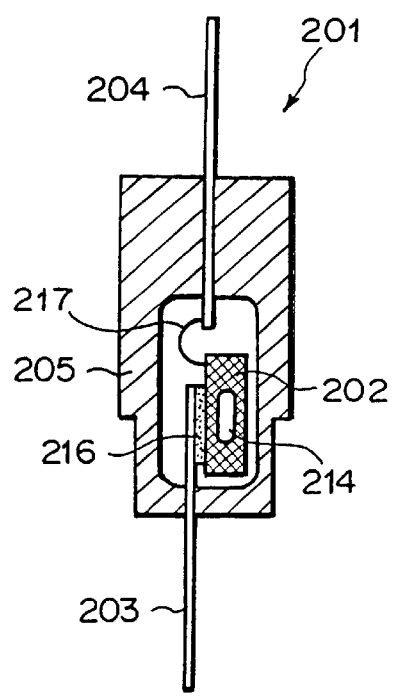
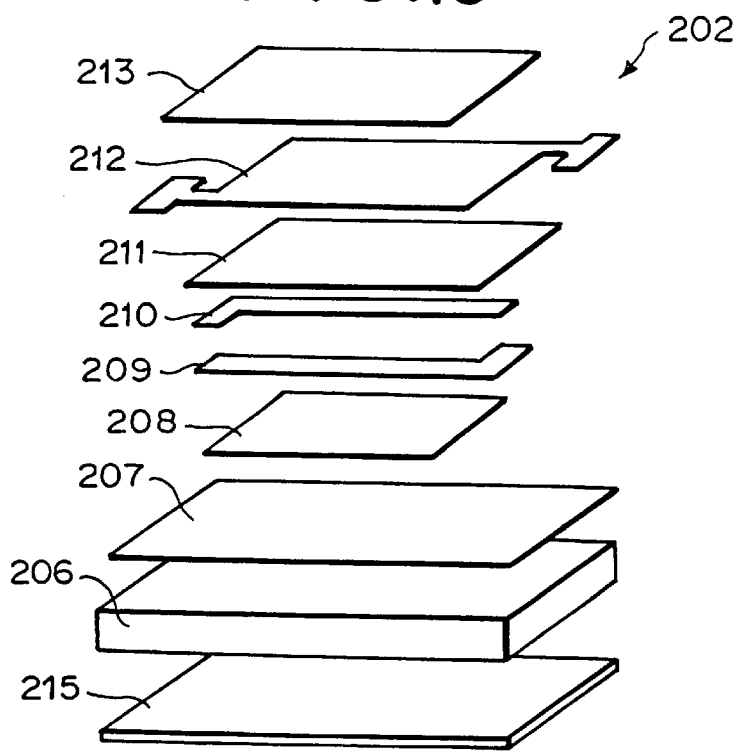

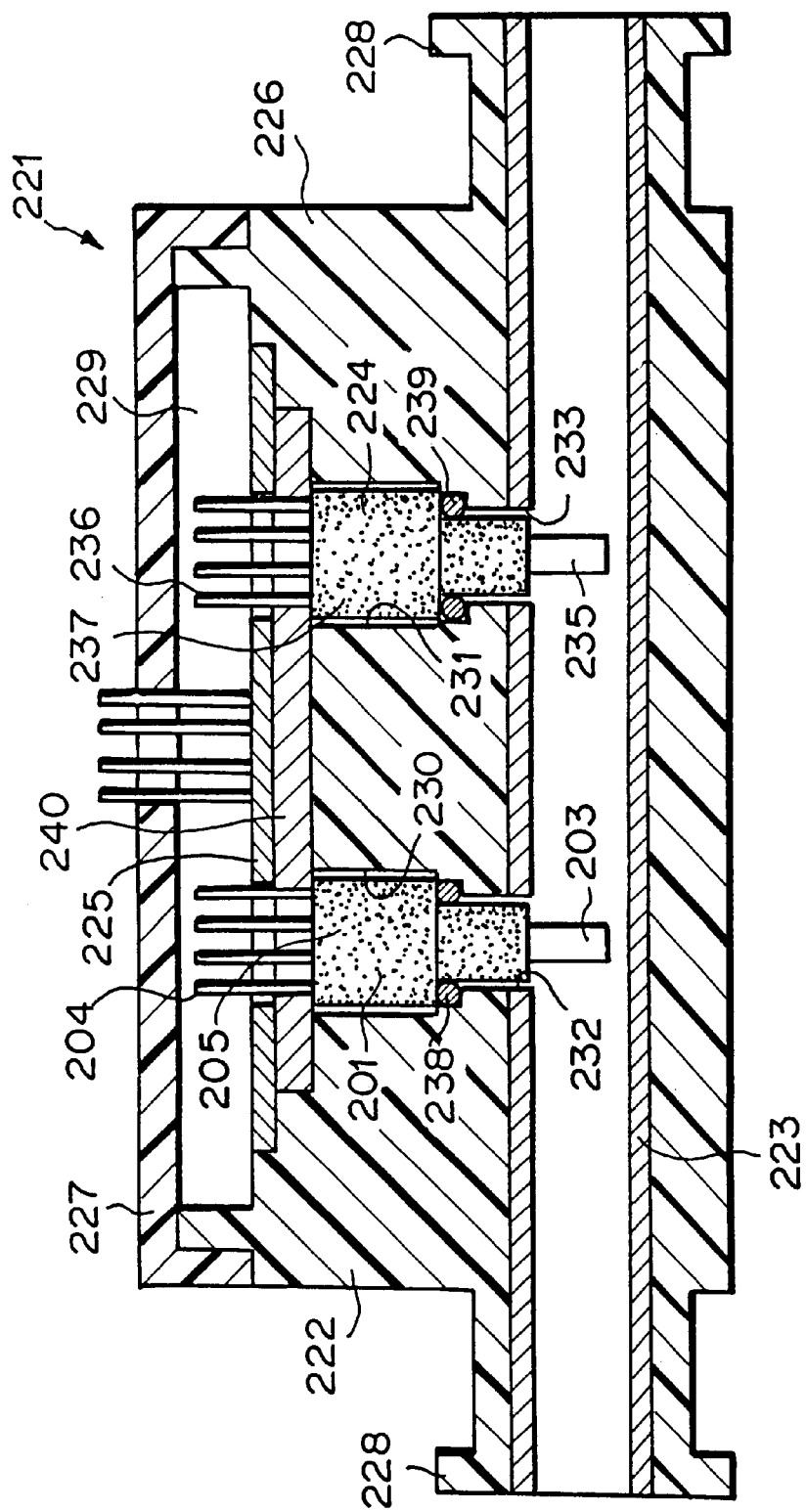

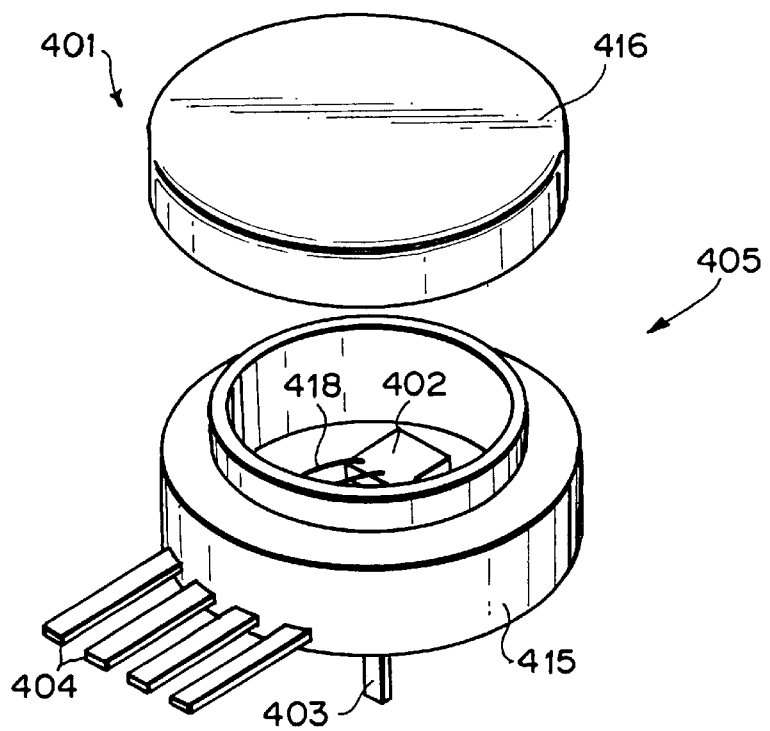
F I G. 22
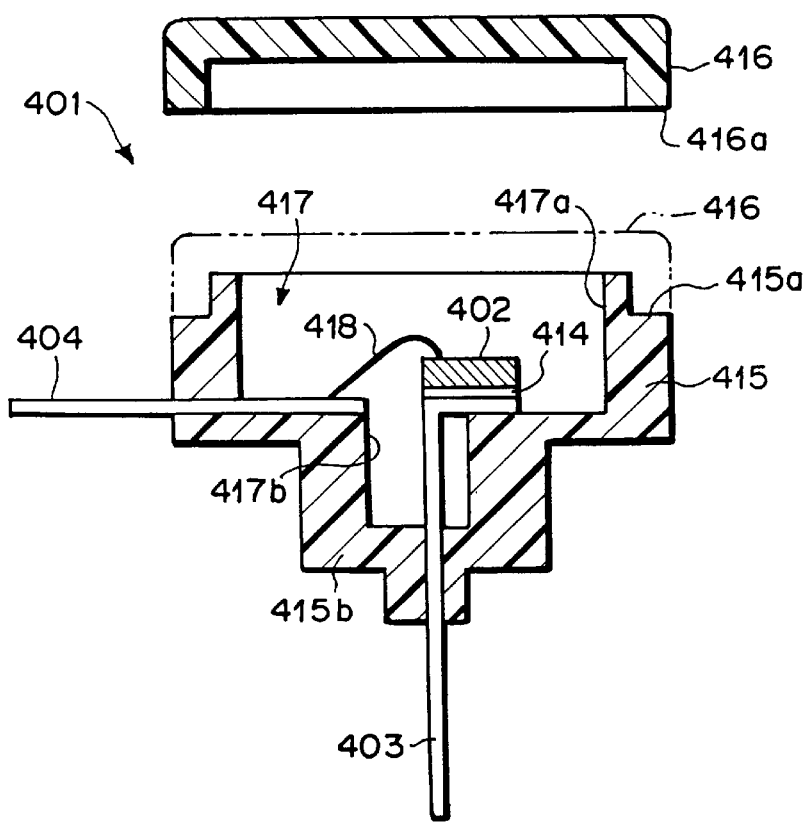
F I G. 23

F I G. 24
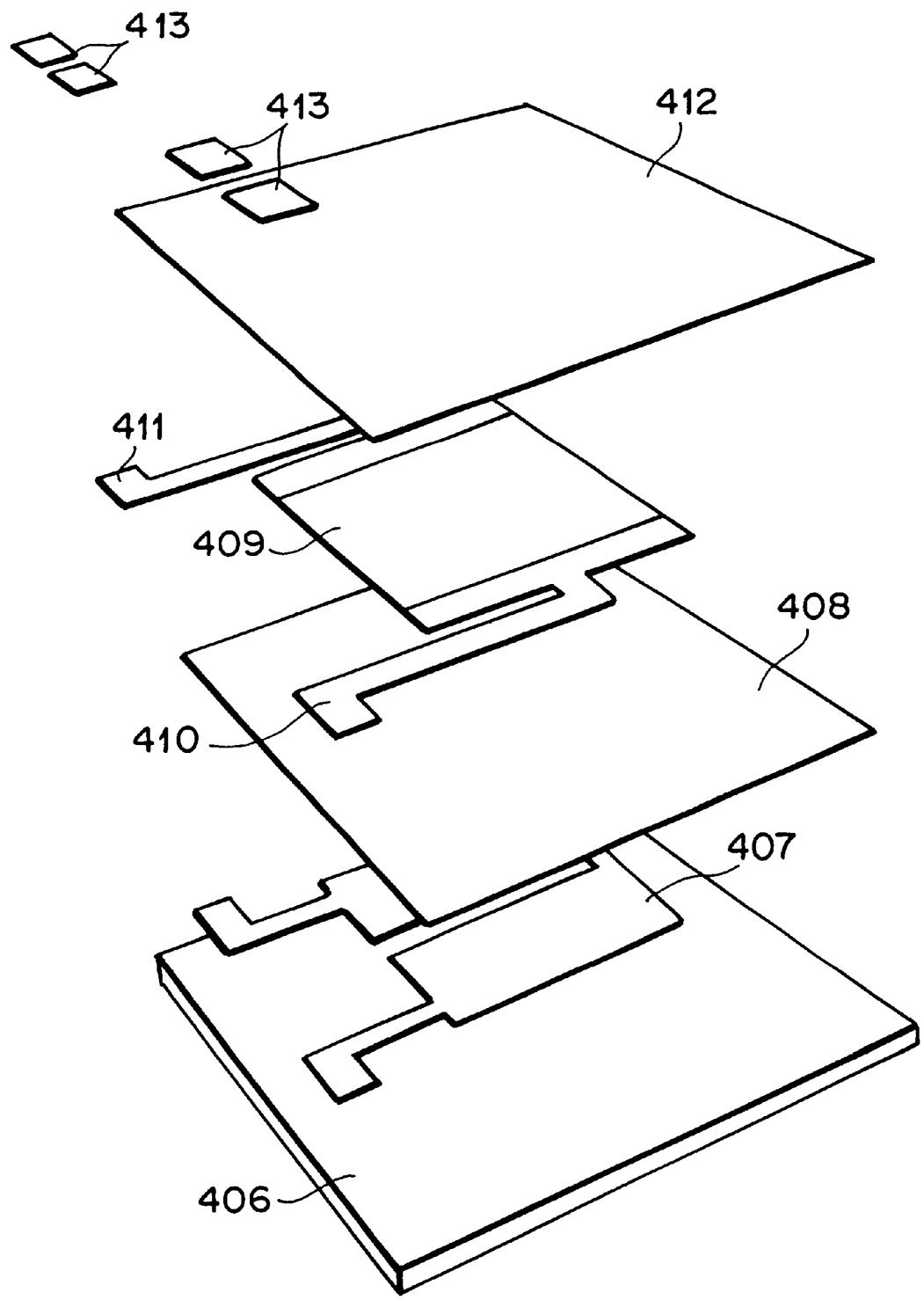

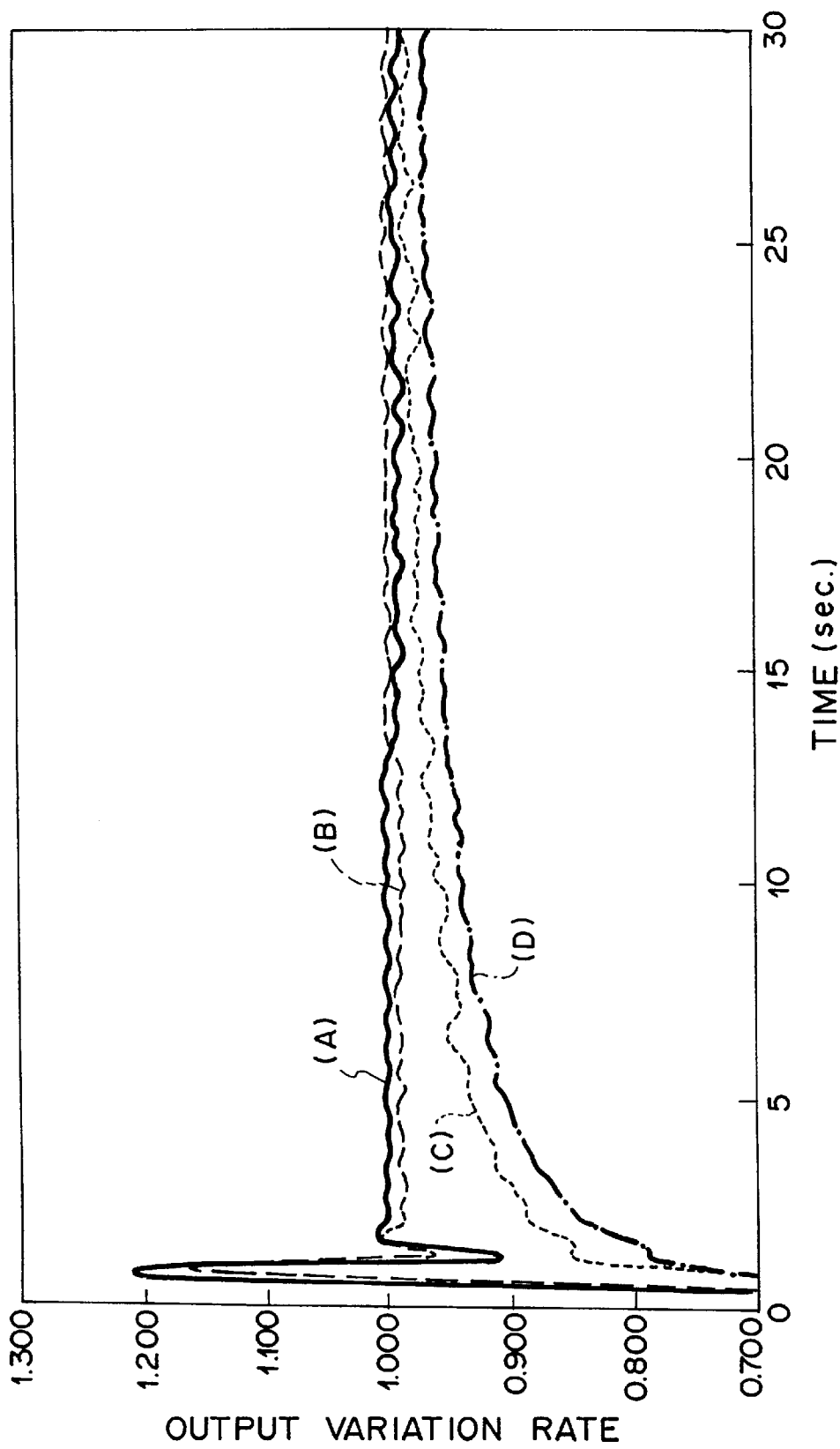

FLOW RATE SENSOR, TEMPERATURE SENSOR AND FLOW RATE DETECTING APPARATUS

BACKGROUND OF THE INVENTION (1) Field of the Invention

The present invention belongs to a fluid flow rate detection technology, and particularly relates to a flow rate sensor and flow rate detecting apparatus for detecting the flow rate of fluid flowing in a pipe line, and to a temperature sensor for detecting temperature of fluid when detecting the flow rate thereof. The flow rate sensor of the present invention is suitably used to accurately measure the flow rate of fluid under various temperature conditions and to make it easy to fabricate the flow rate sensor.

Further, the present invention particularly intends to improve the measurement accuracy of the flow rate sensor, flow rate detecting apparatus and temperature sensor.

(2) Description of Related Art

Various types of sensors have been hitherto used as a flow rate sensor (or flow velocity sensor) for measuring the flow rate (or flow velocity) of various fluid, particularly liquid, and a so-called thermal (particularly indirectly heated type) flow rate sensor is used because the cost can be easily reduced.

A sensor in which a thin-film heating element and a thin-film temperature sensing element are laminated through an insulating layer on a substrate and the substrate is secured to a pipe line is used as an indirectly heated type flow rate sensor, so that the substrate and the fluid in the pipe line are thermally contacted to each other. By passing current through the heating element, the temperature sensing element is heated to vary the electrical characteristic of the temperature sensing element such as the value of the electrical resistance of the temperature sensing element. The electrical resistance value (varied on the basis of the temperature increase of the temperature sensing element) is varied in accordance with the flow rate (flow velocity) of fluid flowing in the pipe line. This is because a part of the heating value of the heating element is transferred through the substrate into the fluid, the heating value diffusing into the fluid is varied in accordance with the flow rate (flow velocity) of the fluid, and the heating value to be supplied to the temperature sensing element is varied in accordance with the variation of the heating value diffusing into the fluid, so that the electrical resistance value of the temperature sensing element is varied. The variation of the electrical resistance value of the temperature sensing element is also varied in accordance with the temperature of the fluid. Therefore, a temperature sensing device for temperature compensation is installed in an electrical circuit for measuring the variation of the electrical resistance value of the temperature sensing element to suppress the variation of the flow-rate measurement value due to the temperature of the fluid at maximum.

An indirectly heated type flow rate sensor using thin film elements as described above is disclosed in JP-08-146026 (A), for example.

The conventional indirectly heated type flow rate sensor has a metallic pipe line to be connected external pipe lines. The fluid flows in the pipe line, which is exposed to the outside. Since the metallic pipe line has high thermal conductivity, the temperature variation of the environmental atmosphere is easily transmitted to the fluid in the pipe line, especially to the fluid at the vicinity of inner wall of the pipe line, resulting in lowering the accuracy of detection of the flow rate by the thermal flow rate sensor, especially in case of small amount of flow rate. Such a problem is significant when the difference between the temperature of the fluid flowing through the pipe line and the environmental temperature is great.

The conventional indirectly heated type flow rate sensor is attached to the external pipe line so that the substrate of a flow rate detector or a casing which is thermally connected to the substrate is exposed from the wall surface of the pipe line to the fluid.

For example, the indirectly heated type flow rate sensor disclosed in the above JP-08-146026(A) as the sensor of high thermal response, high measuring accuracy, small size and producibilty with low cost has the following construction:

As shown in FIGS. 31A and 31B, a flow rate sensor 501 is composed of a thin film heating element 503, thin film temperature sensing element 504 laminated via an insulating layer 505 on a substrate 502, and attached to an appropriate portion of a pipe line 506 as shown in FIG. 32 in application.

In the flow rate sensor 501, the temperature sensing element 504 is heated by supplying electric power to the heating element 503, and the change of the electric resistance value in the temperature sensing element is detected. The flow rate sensor 501 is disposed on the pipe line 506, and therefore a part of the heating value of the heating element 503 is transferred through the substrate 502 into the fluid flowing through the pipe line. The heating value transferred to the temperature sensing element 504 amounts to the heating value generated by the heating element subtracted with the heating value diffusing into the fluid, which is varied in accordance with the flow rate of the fluid. Therefore, the flow rate of the fluid flowing through the pipe line 506 can be detected by detecting the electrical resistance value of the temperature sensing element which is varied in accordance with the heating value to be supplied to the temperature sensing element 504.

The dispersing heating value is also varied in accordance with the temperature of the fluid, and therefore as shown in FIG. 32, a temperature sensor 507 is arranged on an appropriate portion of the pipe line 506, and electrical resistance value of the temperature sensing element is also varied in accordance with the temperature of the fluid. Therefore, a temperature sensing device for temperature compensation is installed in an electrical circuit for measuring the variation of the electrical resistance value of the temperature sensing element to suppress the variation of the flow-rate measurement value due to the temperature of the fluid at maximum.

However, since the conventional flow rate sensor 501 is directly connected to the metallic pipe line 506 which is exposed to the outside, the heating value posessed by the fluid is dissipated to the outside or the heating value is supplied to the fluid through the metallic pipe line 506 having high thermal conductivity, resulting in that the detection accuracy of the flow rate sensor 501 is lowered. The influence of such heat dissipation on the detection accuracy of the flow rate sensor is significant when the flow rate of the fluid is very small, and more significant when the specific heat of the fluid is small.

When the fluid is viscous fluid, particularly viscous fluid having relatively high viscosity, particularly liquid, the flow-velocity distribution on the section perpendicular to the flow of the fluid in the pipe line 506 is more remarkable so as to show a parabolic curve having an extreme value at the central portion, that is, the flow-velocity at the central part greatly didders from the flow velocity at the vicinity of the wall of pipe line. In the case of the conventional sensor in which the substrate 502 or the casing 508 connected to the substrate is merely exposed to the fluid at the wall of the pipe line, the flow-velocity distribution has a great effect on the precision of the flow-rate measurement. This is because the flow velocity of the fluid flowing at the center portion on the section of the pipe line is not taken into consideration, but only the flow velocity of the fluid in the neighborhood of the wall of the pipe line is taken into consideration. As described above, the conventional flow rate sensor has such a problem that it is difficult to measure the flow rate of fluid accurately when the fluid is viscous fluid having relatively high viscosity.

Even when fluid has low viscosity at room temperature, it induces a problem connected to the above viscosity problem because the viscosity of the fluid increases as the temperature is lowered.

Further, the above problem is more remarkable when the flow rate per unit time is relatively low than when the flow rate per unit time is high.

In order to improve the detection accuracy of the indirectly heated type flow rate sensor, it is important to transmit the heat value generated by the heater to the temperature sensor under the influence of only the heat absorption by the fluid. In the conventional indirectly heated type flow rate sensor, however, the heat transmission between the environment and the temperature sensor or heater cannot be ignored as mentioned in the above, and the detected flow rate value is varied in accordance with the environmental temperature, resulting in occurrence of the error in the flow rate detection.

The flow rate sensor is required to be used under an extremely broad temperature environment in accordance with a geographical condition, an indoor or outdoor condition, etc. Further, these conditions are added with a season condition, a day or night condition, etc., and the temperature environment is greatly varied, especially in the outdoor condition. Therefore, there has been required a flow rate sensor which can detect the flow rate accurately under such a broad environmental temperature condition as described above.

SUMMARY OF THE INVENTION

Therefore, an object of the present invention is to provide a flow rate sensor or flowmeter which can accurately measure the flow rate of fluid on by preventing the influence of the environmental temperature condition on the measuring accuracy.

Further, an object of the present invention is to make it easy to fabricate the thermal flow rate sensor or flowmeter.

Further, an object of the present invention is to provide a flow rate sensor or flowmeter which can accurately measure the flow rate of fluid flowing in a pipe line even when the fluid is viscous fluid having relatively high viscosity.

Further, an object of the present invention is to provide a flow rate sensor or flowmeter which can accurately measure the flow rate of fluid flowing in a pipe line even when the flow rate is relatively small.

Still further, an object of the present invention is to provide a flow rate sensor or flowmeter which can accurately measure the flow rate of fluid even when the specific heat is small or the flow rate is small by reducing the heating value dissipated from the flow rate sensor to the casing or the outside.

Further, an object of the present invention is to provide a flow rate sensor or flowmeter which can be attached easily to the casing to be stably fixed thereto and has sufficient durability.

Further, an object of the present invention is to provide a temperature sensor for use in measuring the flow rate of the fluid, which has the construction similar to the flow rate sensor and can accurately measure the flow rate of fluid by reducing the heat transmission between the environmental atmosphere and the temperature sensor.

In order to attain the above object, according to the present invention, there is provided a flow rate sensor comprising:

a flow rate detector having a heating function and a temperature sensing function;

a pipe line for fluid to be detected which is formed so that heat from the flow rate detector is transferred to and absorbed by the fluid, wherein the temperature sensing which is affected by a heat absorption effect of the fluid due to the heat is executed in the flow rate detector, and the flow rate of the fluid in the pipe line is detected on the basis of the temperature sensing result;

at least one unit retaining portion formed on a casing in which the pipe line is formed, the unit retaining portion being disposed adjacent to the pipe line; and a flow rate detecting unit comprising said flow rate detector and retained by the unit retaining portion.

In an aspect of the present invention, the casing is made of synthetic resin.

In an aspect of the present invention, the flow rate detecting unit comprises said flow rate detector, a first heat transfer member provided to the flow rate detector, a first electrode terminal electrically connected to the flow rate detector and a first base portion made of synthetic resin, the first base portion is retained by the unit retaining portion, the first heat transfer member extends from the first base portion into the pipe line, and the first electrode terminal extends from the first base portion to the opposite side to the pipe line.

In an aspect of the present invention, the first heat transfer member extends to at least the vicinity of the central portion on the section of the pipe line.

In an aspect of the present invention, the first base portion comprises an inner portion having elasticity and an outer portion disposed around the inner portion.

In an aspect of the present invention, a cavity is formed in a central portion of the first base portion.

In an aspect of the present invention, the first heat transfer member has a plate form, and the flow rate detector is joined to a portion of the first heat transfer member located in the first base portion.

In an aspect of the present invention, a seal member for the pipe line is interposed between the first base member and the casing.

In an aspect of the present invention, a device accommodating portion is formed in the casing at the outside of the unit retaining portion, a wiring board is disposed in the device accommodating portion.

In an aspect of the present invention, the device accommodating portion is covered by a lid portion.

In an aspect of the present invention, the flow rate detector comprises a thin-film heating element and a flow rate detecting thin-film temperature sensing element disposed so as to be affected by the effect of the heating of the thin-film heating element, the thin-film heating element and the flow rate detecting thin-film temperature sensing element being formed on a first substrate.

In an aspect of the present invention, the first heat transfer member is joined to the first substrate.

In an aspect of the present invention, the thin-film heating element and the flow rate detection thin-film temperature sensing element are laminated on a first surface of the first substrate through a first insulating layer.

In an aspect of the present invention, the first heat transfer member is joined to a second surface of the first substrate.

In an aspect of the present invention, the dimension of the first heat transfer member in the direction of the pipe line is set to be larger than the dimension in the direction perpendicular to the extension direction of the first heat transfer member within the section of the pipe line.

In an aspect of the present invention, the flow rate sensor further comprises a temperature detecting unit retained by the unit retaining portion other than that for retaining the flow rate detecting unit, the temperature detecting unit including a temperature detector for detecting the temperature of the fluid in the pipe line for compensation when the flow rate of the fluid in the pipe line is detected.

In an aspect of the present invention, the temperature detecting unit comprises said temperature detector, a second heat transfer member provided to the temperature detector, a second electrode terminal electrically connected to the temperature detector and a second base portion made of synthetic resin, the second base portion is retained by the unit retaining portion other than that for retaining the flow rate detecting unit, the second heat transfer member extends from the second base portion into the pipe line, and the second electrode terminal extends from the second base portion to the opposite side to the pipe line.

In an aspect of the present invention, the second heat transfer member extends to at least the vicinity of the central portion on the section of the pipe line.

In an aspect of the present invention, the second base portion comprises an inner portion having elasticity and an outer portion disposed around the inner portion.

In an aspect of the present invention, a cavity is formed in a central portion of the second base portion.

In an aspect of the present invention, the second heat transfer member has a plate form, and the temperature detector is joined to a portion of the second heat transfer member located in the second base portion.

In an aspect of the present invention, a seal member for the pipe line is interposed between the second base member and the casing.

In an aspect of the present invention, the wiring board and the second electrode terminal of the temperature detecting unit are electrically connected to each other.

In an aspect of the present invention, the temperature detector comprises a temperature detection thin-film temperature sensing element on the second substrate.

In an aspect of the present invention, the second heat transfer member is joined to the second substrate.

In an aspect of the present invention, the temterature detection thin-film temperature sensing element are laminated on a first surface of the second substrate through a second insulating layer.

In an aspect of the present invention, the second heat transfer member is joined to a second surface of the second substrate.

In an aspect of the present invention, the dimension of the second heat transfer member in the direction of the pipe line is set to be larger than the dimension in the direction perpendicular to the extension direction of the second heat transfer member within the section of the pipe line.

In order to attain the above object, according to the present invention, there is also provided a flow rate sensor comprising:
- a flow rate detector having a heating function and a temperature sensing function;
- a pipe line for fluid to be detected which is formed so that heat from said flow rate detector is transferred to and absorbed by the fluid, wherein the temperature sensing which is affected by a heat absorption effect of the fluid due to the heat is executed in said flow rate detector, and the flow rate of the fluid in said pipe line is detected on the basis of the temperature sensing result; and
- a casing made of synthetic resin.

In order to attain the above object, according to the present invention, there is also provided a flow rate detecting unit or flow rate sensor for use in a flow rate sensor including a flow rate detector having a heating function and a temperature sensing function in which the temperature sensing which is affected by a heat absorption effect of fluid due to the heat is executed and the flow rate of the fluid is detected on the basis of the temperature sensing result, the flow rate detecting unit comprising:
- the flow rate detector;
- a first heat transfer member provided to the flow rate detector;
- a first electrode terminal electrically connected to the flow rate detector; and
- a first base portion made of synthetic resin, wherein the first heat transfer member and the first electrode terminal extends to the opposite side to each other.

In order to attain the above object, according to the present invention, there is also provided a fluid temperature detecting unit or fluid temperature sensor for use in a flow rate sensor including a flow rate detector having a heating function and a temperature sensing function in which the temperature sensing which is affected by a heat absorption effect of fluid due to the heat is executed and the flow rate of the fluid is detected on the basis of the temperature sensing result in order to perform compensation of the flow rate detected due to the temperature of the fluid, the temperature detecting unit comprising:
- a temperature detector;
- a second heat transfer member provided to the temperature detector;
- a second electrode terminal electrically connected to the temperature detector; and
- a second base portion made of synthetic resin, wherein the second hea t transfer member and the second electrode terminal extends to the opposite si de to each other.

In order to attain the above object, according to the present invention, there is also provided a flow rate sensor comprising:
- a flow rate detector having a heating function and a temperature sensing function;
- a pipe line for fluid to be detected; and
- a flow rate detection heat transfer member which is disposed so as to be affected by heat from the flow rate detector and extends into the pipe line,
- wherein the temperature sensing which is affected by a heat absorption effect of the fluid due to the heat via the flow rate detection heat transfer member is executed in the flow rate detector, and the flow rate of the fluid in the pipe line is detected on the basis of the temperature sensing result, and, the flow rate detector and a portion of the flow rate detection heat transfer member thermally connected to the flow rate detector are sealed within a flow rate detection base portion made of synthetic resin having a thermal conductivity of 0.7 [W/m.K] or less.

In an aspect of the present invention, the flow rate detection base portion is made of synthetic resin having a thermal conductivity of 0.4 [W/m.K] or less.

In an aspect of the present invention, the flow rate detection base portion extends in a radial direction of the pipe line and passes through a central axis of the pipe pine.

In an aspect of the present invention, the flow rate detection heat transfer member has a plate form being disposed in the pipe line along the pipe line.

In an aspect of the present invention, the flow rate detector comprises a thin-film heating element and a flow rate detecting thin-film temperature sensing element disposed so as to be affected by the effect of the heating of the thin-film heating element outside the pipe line, the thin-film heating element and the flow rate detecting thin-film temperature sensing element being formed on a first substrate.

In an aspect of the present invention, the flow rate sensor further comprises a fluid temperature detector to perform compensation of the flow rate detected in the flow rate detection, wherein the fluid temperature detector and a fluid temperature detection heat transfer member disposed so as to extend into the pipe line are thermally connected to each other.

In an aspect of the present invention, the flow rate detector and a portion of the temperature detection heat transfer member thermally connected to the flow rate detector are sealed within a temperature detection base portion made of synthetic resin having a thermal conductivity of 0.7 [W/m.K] or less.

In an aspect of the present invention, the temperature detection base portion is made of synthetic resin having a thermal conductivity of 0.4 [W/m.K] or less.

In an aspect of the present invention, the temperature detection base portion extends in a radial direction of the pipe line and passes through a central axis of the pipe pine.

In an aspect of the present invention, the temperature detection heat transfer member has a plate form being disposed in the pipe line along the pipe line.

In an aspect of the present invention, the flow rate sensor further comprising heating control means for controlling the heating of the heating element connected to a passage for supplying electric current to the heating element, wherein the heating control means controls the current to be supplied to the heating element on the basis of the temperature sensing result so that the temperature sensing result is coincident with a target value, and the flow rate of the fluid is detected on the basis of the control state of the heating control means.

In order to attain the above object, according to the present invention, there is also provided a flow rate sensor comprising;
  a flow rate detector having a heating element and a temperature sensing element formed on a substrate;
  a fin plate for transferring heat to fluid to be detected therethrough, and
  an output terminal for outputting the voltage value corresponding to the flow rate, wherein the flow rate detector, a part of the fin plate and a part of the output terminal are coated by molding.

In an aspect of the present invention, the flow rate detector is fixed to an end surface of the fin plate, the flow rate detector and the output terminal are connected to each other via a bonding wire.

In an aspect of the present invention, the fin plate and the output terminal are manufactured by processing a plate to a plate base member and then processing the plate base member to the fin plate and the output terminal.

In an aspect of the present invention, the plate base member is formed by etching the plate.

According to the present invention, there is provided a flow rate detecting apparatus comprising:
  the flow rate sensor as described in the above;
  a casing having a sensor hole for accommodating the flow rate sensor; and
  a fluid flow passage pipe having an opening disposed at a position corresponding to the sensor hole.

In an aspect of the present invention, a seal member is interposed between the flow rate sensor and the sensor hole.

In an aspect of the present invention, the flow rate detecting apparatus further comprising a fluid temperature sensor, wherein a sensor hole for accommodating the temperature sensor is formed in the casing and an opening disposed at a position corresponding to the sensor hole for accommodating the temperature sensor in the fluid flow passage pipe.

In an aspect of the present invention, a seal member is interposed between the temperature sensor and the sensor hole for accommodating the temperature sensor.

According to the present invention, there is provided a flow rate sensor comprising;
  a flow rate detector having a heating element and a temperature sensing element formed on a substrate; and
  a recess portion formed in the substrate, the recess portion being sealed with an air layer formed therein.

In an aspect of the present invention, the recess portion is formed by etching.

In an aspect of the present invention, the recess portion is sealed by a glass plate.

In an aspect of the present invention, the flow rate sensor further comprises a fin plate performing heat transmission to the fluid, wherein the flow rate detector is fixed to a surface of an end portion of the fin plate so that a side of the flow rate detector on which the heating element and the temperature sensing element is positioned confront the surface of the end portion of the fin plate.

According to the present invention, there is provided a flow rate sensor comprising:
  a flow rate detector having a heating element and a temperature sensing element with an insulator interposed therebetween;
  a fin plate an end portion of which is joined to the flow rate detector;
  an output terminal electrically connected to the flow rate detector; and
  a housing made of resin accommodating the flow rate detector,
  wherein the fin plate and the output terminal extend to the outside of the housing, a cavity is provided in the housing and the flow rate detector is disposed in the cavity.

In an aspect of the present invention, the end portion of the fin plate joined to the flow rate detector and an end portion of the output terminal connected to the flow rate detector are positioned in the cavity.

In an aspect of the present invention, the end portion of the fin plate joined to the flow rate detector and an end portion of the output terminal connected to the flow rate detector are positioned in the cavity.

In an aspect of the present invention, the end portion of the fin plate joined to the flow rate detector and an end portion of the output terminal connected to the flow rate detector are positioned in the cavity.

In an aspect of the present invention, a notched portion is formed on an outer peripheral surface of the housing.

In an aspect of the present invention, the housing comprises a main body portion having a recess portion and a lid portion covering the recess portion.

According to the present invention, there is also provided a temperature sensor comprising;
- a temperature detector having a temperature sensing element and an insulator laminated on the temperature sensing element;
- a fin plate an end portion of which is joined to the temperature detector;
- an output terminal electrically connected to the temperature detector; and
- a housing made of resin accommodating the temperature detector,
- wherein the fin plate and the output terminal extend to the outside of the housing, a cavity is provided in the housing and the temperature detector is disposed in the cavity.

In an aspect of the present invention, the end portion of the fin plate joined to the temperature detector and an end portion of the output terminal connected to the emperature detector are positioned in the cavity.

In an aspect of the present invention, a notched portion is formed on an outer peripheral surface of the housing.

In an aspect of the present invention, the housing comprises a main body portion having a recess portion and a lid portion covering the recess portion.

BRIEF DESCRIPTION OF THE DRAWINGS

FIG. 13 is a graph showing a variation of the output voltage with time lapse in the flow rate sensor according to the present invention;

FIGS. 14A and 14B are front sectional view and side sectional view showing a flow rate sensor according to the present invention;

FIG. 15 is an exploded, perspective view showing the flow rate detector of the flow rate sensor according to the present invention;

FIG. 19 is a cross-sectional view showing a flow rate detecting apparatus including the flow rate sensor;

FIG. 22 is an exploded perspective view showing an embodiment of a flow rate sensor according to the present invention;

FIG. 23 is a cross-sectional view showing the flow rate sensor of FIG. 22 where a lid portion is separated from a body portion;

FIG. 24 is an exploded perspective view showing a flow rate detector;

FIG. 30 is a graph showing a variation of an output variation rate with time lapse in the flow rate sensor according to the present invention and the comparative flow rate sensor;

PREFERRED EMBODIMENTS FOR EXECUTING THE INVENTION

Embodiments of the present invention will be described with reference to the drawings.

Figure 1:
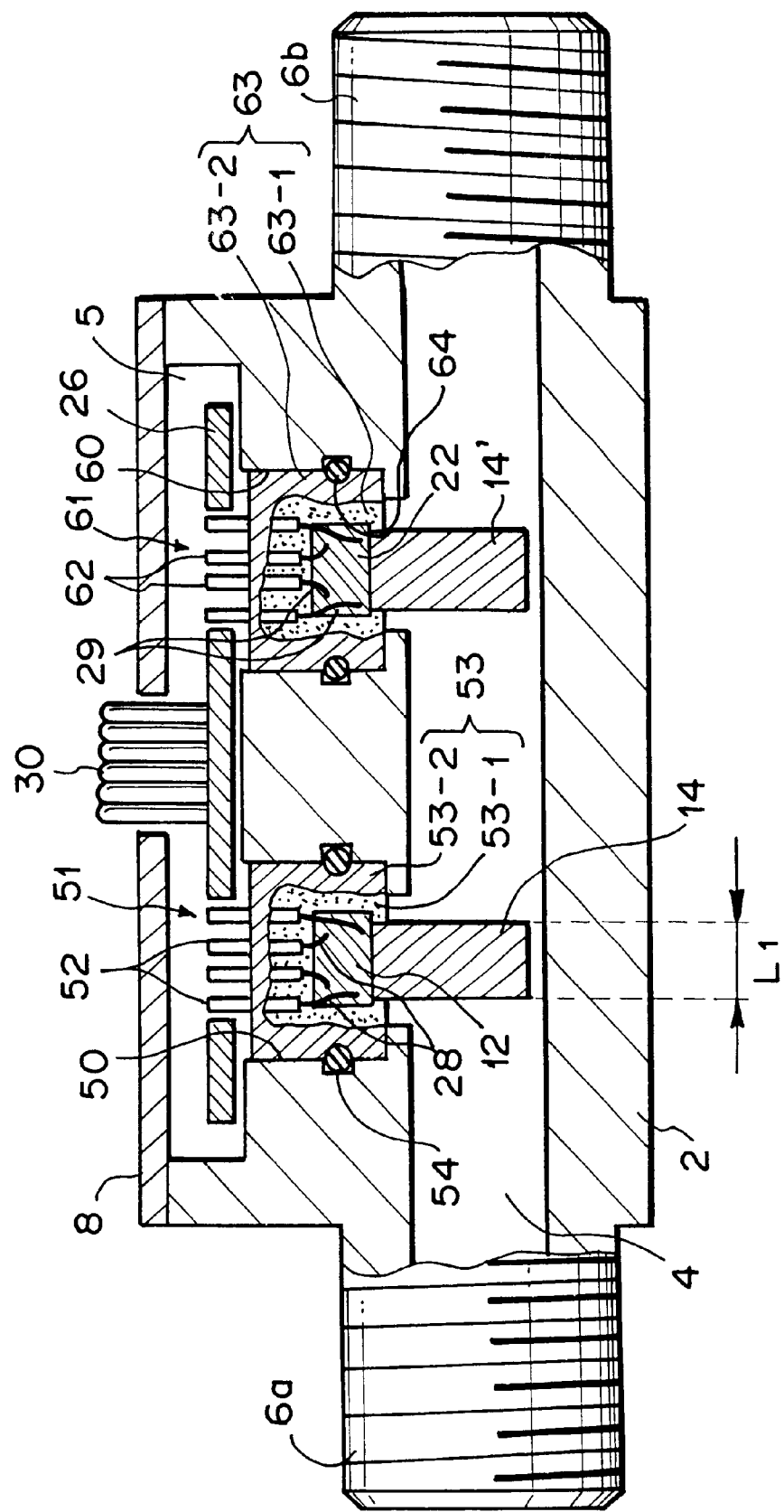
FIG. 1 is a partially cut-out side view showing an embodiment of a flow rate sensor according to the present invention.
Figure 2:
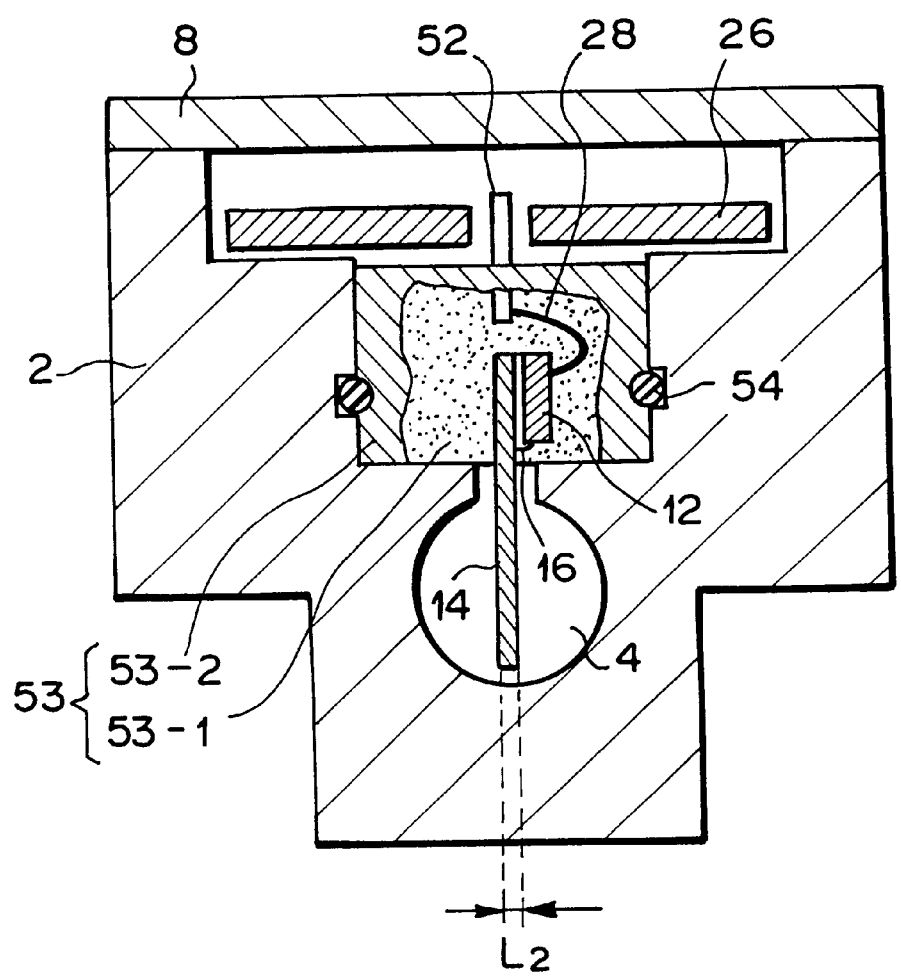
FIG. 2 is a cross-sectional view showing the embodiment of the flow rate sensor according to the present invention.

FIG. 1 is a partially cut-out side view showing an embodiment of a flow rate sensor according to the present invention, and FIG. 2 is a cross-sectional view of FIG. 1.

In these figures, 2 represents the main body portion of a casing, and a pipe line 4 serving as a flow passage for fluid to be detected is formed so as to penetrate through the casing main body portion. The pipe line 4 extends to both the ends of the casing main body portion 2. Connection portions 6a, 6b (e.g. external thread) for connecting to an external pipe are formed at both ends of the casing main body portion. The casing main body portion 2 is made of a synthetic resin, for example vinyl chloride resin, or glass fiber reinforced polyphenylen sulfide (PPS) or polybutylene terephthalate (PBT) having good chemical-resistance and oil-resistance, etc. A device accommodating portion is formed at the upper side of the pipe line 4 in the casing 2, and a casing lid portion 8 is fixed to the accommodation portion by a screw or tight fitting. The casing is constructed by the casing lid portion 8 and the casing main body portion 2.

In this embodiment, two device unit retaining portions 50, 60 are formed at the bottom (i.e. side near the pipe line 4) of the device accommodating portion 5 of the casing main body portion 2 so as to be adjacent to the pipe line 4. The unit retaining portions 50, 60 each has a cylindrical inner surface having a symmetrical axis extending in radial direction of the pipe line 4. A flow rate detecting unit 51 is retained by the first retaining portion 50, and a temperature detecting unit 61 is retained by the second retaining portion 60.

The flow rate detecting unit 51 has a flow rate detector 12, a fin plate 14 serving as a heat transfer member joined to the flow rate detector 12 via an adhesive member 16 having good thermal conduction property, electrode terminals 52, bonding wires 28 electrically connecting electrodes of the flow rate detector 12 to the corresponding electrode terminals 52, a base portion 53 made of synthetic resin. The base portion 53 comprises two portions which are different from each other, one of which is an inner portion 53-1 and the other is an outer portion 53-2. The inner portion 53-1 is elastic and is made of fluororubber for example, so that it can be deformed by absorbing stress caused due to the difference in thermal expansion property among the casing main body portion 2 and members of the flow rate detecting unit 51 on the basis of the temperature variation. The outer portion 53-2 is hard, chemical-resistant and oil-resistant, and is made of polyphenylen sulfide (PPS) or polybutylene terephthalate having good chemical-resistance and oil-resistance, etc. The base portion 53 has a cylindrical outer surface corresponding to the inner surface of the retaining portion 50. A part of the fin plate 14 extends from the base portion 53 into the pipe line 4, while a part of the electrode terminal 52 extends from the base portion 53 toward the opposite side (outside). That is, the flow rate detector 12, the adhesive member 16, a part of the fin plate 14 and a part of the electrode terminal 52 are sealed with the base portion 53.

Figure 3:
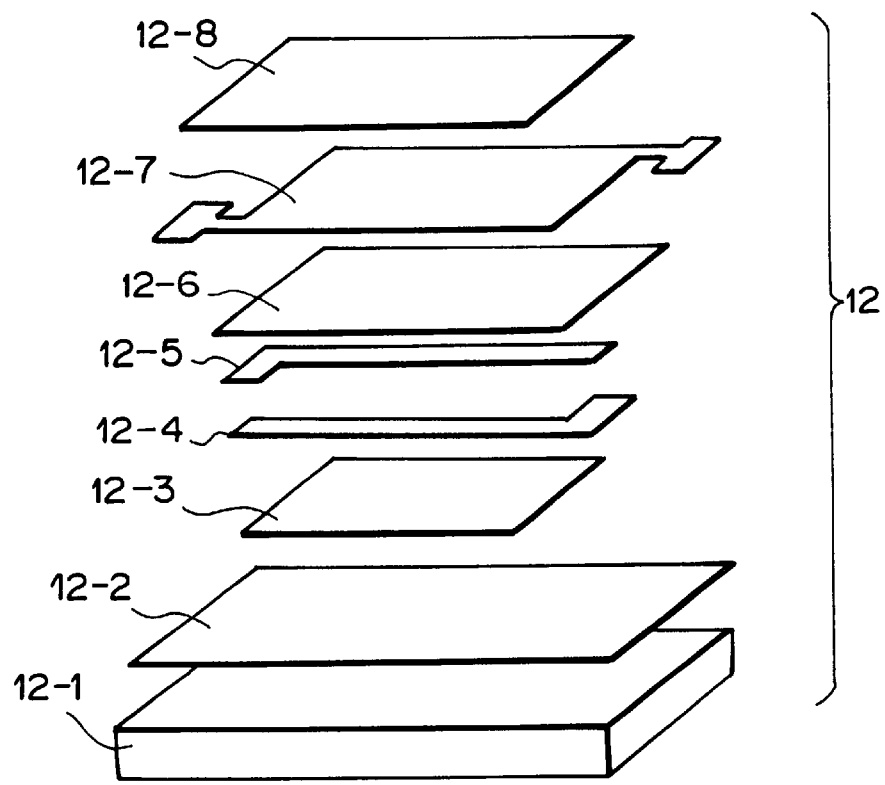
FIG. 3 is an exploded perspective view showing a flow rate detector of the embodiment of the flow rate sensor according to the present invention.

As shown in FIG. 3, the flow rate detector 12 is designed in a chip structure by forming an insulating layer 12-2 on the upper surface (first surface) of a substrate 12-1, forming a thin-film heating element 12-3 on the insulating layer 12-2, forming on the heating element a pair of electrode layers 12-4, 12-5 for the thin-film heating element, forming an insulating layer 12-6 thereon, forming a flow rate detection thin-film temperature sensing element 12-7 on the insulating layer 12-6 and then forming an insulating layer 12-8 on the flow rate detection thin-film temperature sensing element 12-7. As the substrate 12-1 may be used a member which is set to about 0.5 mm in thickness and about 2 to 3 mm in square and also formed of silicon or alumina (when an insulating substrate of alumina or the like is used, the insulating layer 12-2 may be omitted), and as the thin-film heating element 12-3 may be used a member of cermet which is set to about 1 $\mu$m in thickness and designed in a desired shape by patterning. As the electrode layers 12-4, 12-5 may be used a member which is formed of nickel at a thickness of about 0.5 $\mu$m or a member obtained by laminating gold layer on the above member at a thickness of about 0.1 $\mu$m. The insulating layers 12-2, 12-6, 12-8 may be formed of $SiO_2$ at a thickness of about 1 $\mu$m. As the thin-film temperature sensing element 12-7 may be used a metal resistant film having a large and stable temperature coefficient such as platinum or nickel which is patterned into a desired shape, for example, a meandering shape at a thickness of about 0.5 to 1 $\mu$m (or may be used a member formed of NTC thermistor of manganese oxide). The thin-film heating element 12-3 and the thin-film temperature sensing element 12-7 are disposed so as to be extremely proximate to each other through the thin-film insulating layer 12-6 as described above, whereby the thin-film temperature sensing element 12-7 is immediately affected by the effect of the heating of the thin-film heating element 12-3.

As shown in FIG. 2, a fin plate 14 serving as a heat transfer member is joined to one surface of the flow rate detector 12, that is, the second surface of the substrate 12-1 by a joint member 16 having excellent thermal conductivity. The fin plate 14 may be formed of copper, duralumin, copper-tungsten alloy or the like. Silver paste may be used as the joint member 16. An opening through which the fin plate 14 is penetrated is formed at the position in the casing main body portion 2 at which the flow rate detector 12 is disposed.

As shown in FIGS. 1 and 2, an O-ring 54 as a sealing member for the pipe 4 is disposed between the outer peripheral surface of the base portion 53 and the inner surface of the unit retaining portion 50.

The upper portion of the fin plate 14 is connected to the flow rate detector 12 while the lower portion thereof extends into the pipe line 4. The fin plate 14 extends into the pipe line 4 having a substantially circular shape so as to pass through the center on the section of the pipe line 4 and traverse from the upper portion to the lower portion of the pipe line 4. However, the pipe line 4 is not necessarily circular in section, but may have a proper sectional shape. In the pipe line 4, the dimension $L_1$ of the fin plate 14 in the pipe direction is sufficiently larger than the thickness $L_2$ of the fin plate 14. Therefore, the fin plate 14 can excellently transfer heat between the flow rate detector 12 and the fluid without greatly affecting the flow of the fluid in the pipe line 4.

In the casing main body portion 2, the unit retaining portion 60 is disposed at a position which is separated from the unit retaining portion 50 along the pipe line 4. The temperature detector 61 is retained by the unit retaining portion 60.

The temperature detecting unit 61 has a temperature detector 22, a fin plate 14' serving as a heat transfer member joined to the temperature detector 22 via an adhesive member having good thermal conduction property, electrode terminals 62, bonding wires 29 electrically connecting electrodes of the temperature detector 22 to the corresponding electrode terminals 62, a base portion 63 made of synthetic resin. The base portion 63 comprises two portions which are different from each other, one of which is an inner portion 63-1 and the other is an outer portion 63-2. The inner portion 63-1 is elastic and is made of fluororubber for example, so that it can be deformed by absorbing stress caused due to the difference in thermal expansion property among the casing main body portion 2 and members of the temperature detecting unit 61 on the basis of the temperature variation. The outer portion 63-2 is hard, chemical-resistant and oil-resistant, and is made of polyphenylen sulfide (PPS) or polybutylene terephthalate having good chemical-resistance and oil-resistance, etc. The base portion 63 has a cylindrical outer surface corresponding to the inner surface of the retaining portion 60. A part of the fin plate 14' extends from the base portion 63 into the pipe line 4, while a part of the electrode terminal 62 extends from the base portion 63 toward the opposite side (outside). That is, the temperature detector 22, a part of the fin plate 14' and a part of the electrode terminal 62 are sealed with the base portion 63.

The temperature detector 22 is designed in such a chip structure that a thin-film temperature sensing element for the temperature compensation of the fluid similar to that of the flow rate detector 12 is formed on a substrate similar to that of the flow rate detector 12. That is, the temperature detector 22 has the same construction as shown in FIG. 3 with the exception that the thin-film heating element 12-3, a pair of electrode layers 12-4, 12-5 and the insulating layer 12-6 are omitted. The temperature detector 22 is connected to the fin plate 14' via a joining member as in the case of the flow rate detector 12.

The temperature detecting unit 61 is preferably positioned at the upstream side of the flow rate detecting unit 51 relative to the flowing direction of the fluid in the pipe 4.

In the accommodating portion 5 of the casing body portion 2, a wiring board 26 is fixedly disposed. Some electrodes of the wiring board 26 are electrically connected to the electrodes 52 of the flow rate detecting unit 51 by wire bonding etc. (not shown), and also to the electrodes 62 of the temperature detecting unit 61 by wire bonding etc. (not shown). Some other electrodes of the wiring board 26 are connected to external lead wires 30, and the external lead wires 30 extend to the outside of the casing.

Figure 4:
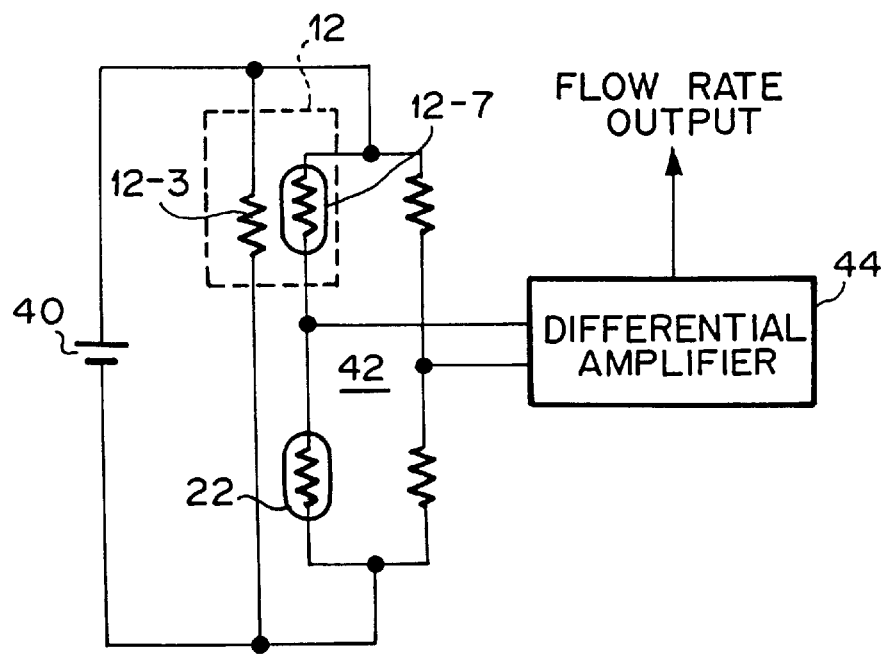
FIG. 4 is a circuit diagram showing the embodiment of the flow rate sensor according to the present invention.
Figure 5:
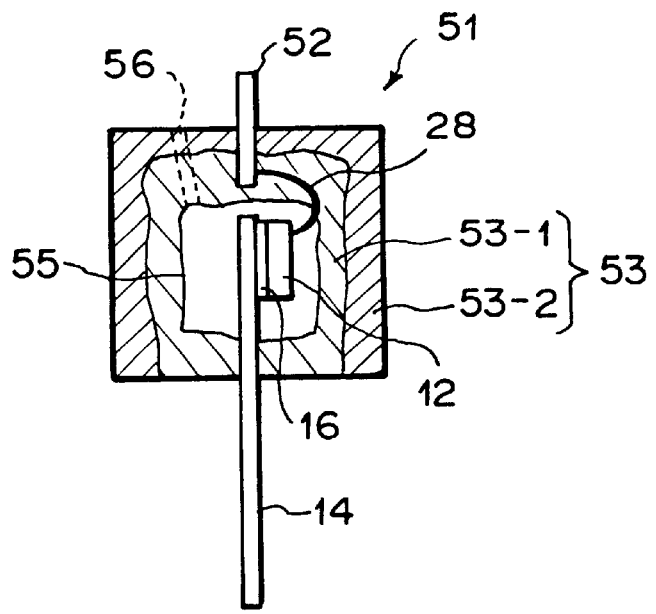
FIG. 5 is a cross-sectional view showing a modification of a flow rate detecting unit of the flow rate sensor according to the present invention.

FIG. 4 is a diagram showing the circuit construction of the flow rate sensor of this embodiment. As shown in FIG. 5, the voltage of a DC power source 40 is applied to the thin-film heating element 12-3 and the bridge circuit 42. An output indicating the flow rate is obtained from a differential amplifier 44 in the bridge circuit 42. That is, in the flow rate detector 12, the thin-film temperature sensing element 12-7 executes the temperature sensing operation which suffers the heat absorption effect of the fluid to be detected through the fin plate 14 due to the heating of the thin-film heating element 12-3, and the flow rate of the fluid to be detected in the pipe line 4 is detected on the basis of the temperature sensing result and the result of compensation due to the fluid temperature detected by the temperature detector 22 through the fin plate 14'.

FIG. 5 is a cross-sectional view showing a modification of the flow rate detecting unit 51 of the above embodiment. In the flow rate detecting unit 51, a cavity 55 is formed at the central portion of the base portion 53, i.e. the central portion of the inner portion 53-1. The flow rate detector 12 is disposed in the cavity 55. The thermal influence of the environment on the flow rate detector 12 can be reduded on the basis of the adiabatic effect of the cavity 55. A vent hole 56 is provided on the base portion for communicating the cavity 55 to the device accommodating portion 5. The temperature detecting unit 61 may also have the cavity and the vent hole.

Figure 6:
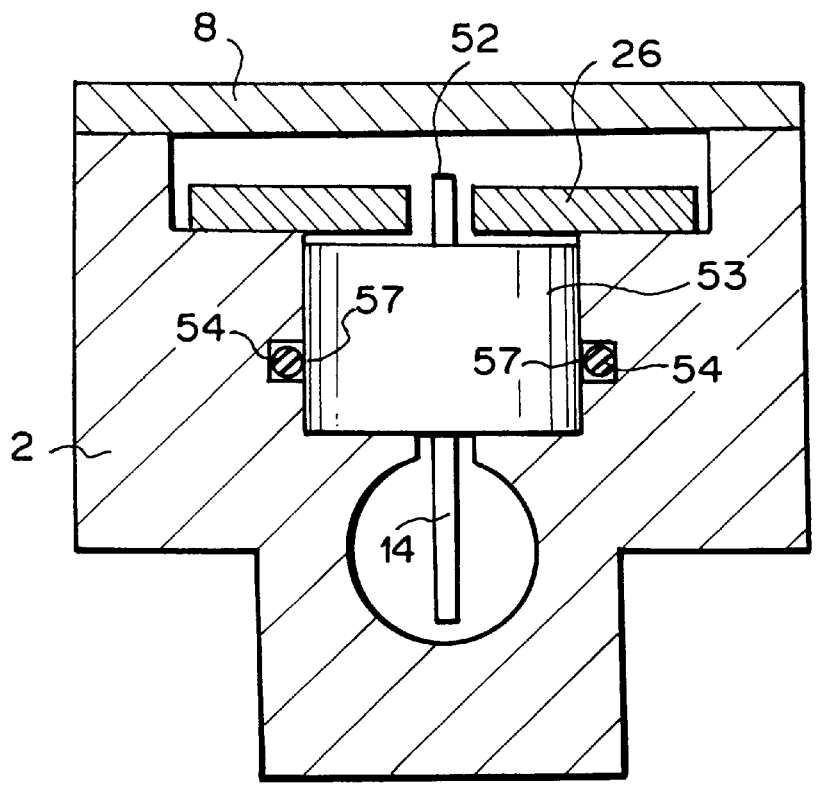
FIG. 6 is a cross-sectional view showing a modification in attaching the flow rate detecting unit to a unit retaining portion of the flow rate sensor according to the present invention.

FIG. 6 is a cross-sectional view showing a modification of the installtation of the flow rate detecting unit 51 into the unit retaining portion 50 of the above embodiment. In FIGS. 1 and 2, an O-ring retained groove is formed on both the inner surface of the unit retaining portion 50 and the outer surface of the flow rate detecting unit 51, whereas in the modification of FIG. 6 the O-ring retained groove 57 is formed only on the inner surface of the unit retaining portion 50. The O-ring retained groove may be formed only on the outer surface of the flow rate detecting unit 51. The installation of the temperature detecting unit 61 into the unit retaining portion 60 may be performed in the same manner as the flow rate detecting unit 51.

According to the above embodiment, the casing main body portion 2 is formed of the synthetic resin having low thermal conductivity, and therefore the variation of the environmental temperature does not immediately influence the temperature of the fluid in the pipe 4 and the flow rate detection can be performed with less influence of the environmental temperature variation.

According to the above embodiment, the flow rate detecting unit 51 having the flow rate detector 12 is retained by the unit retaining portion 50 and the temperature detecting unit 61 having the temperature detector 22 is retained by the unit retaining portion 60, and therefore the fabrication work in the manufacturing process can be easily performed.

Since the fin plates 14, 14' are used, an accurate flow rate detection can be performed with sufficiently reflecting the flow rate distribution even when the fluid to be detected is viscous fluid having relatively high viscosity, and further for any type of flow rate distribution in the radial direction on the section of the pipe line 4. Accordingly, even when the flow rate is relatively minute or under a broad environmental temperature condition, the flow rate of the fluid flowing in the pipe can be accurately measured.

In the above embodiment, the fin plates 14, 14' are disposed so as to pass through the center portion on the section of the pipe line and traverse from the upper portion to the lower portion of the pipe line. However, the fin plates 14, 14' may be disposed so as to extend from the upper portion on the section of the pipe line to the vicinity of the central portion. With this construction, for any type flow rate distribution in the radial direction on the section of the pipe line 4, the flow rate detection can be accurately performed with excellently reflecting the flow rate distribution.

Figure 7:
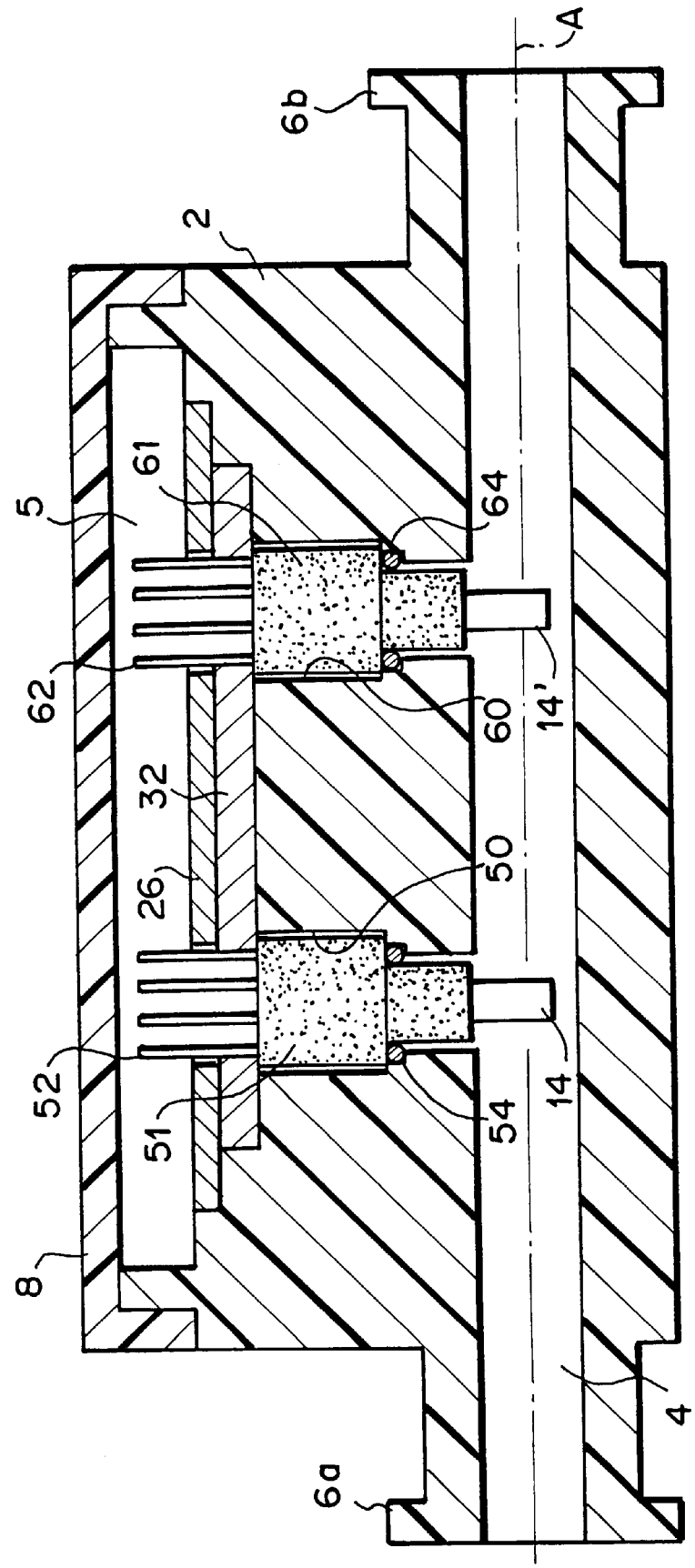
FIG. 7 is a cross-sectional view showing an embodiment of the flow rate sensor according to the present invention, taken along a pipe line for fluid flowing.
Figure 8:
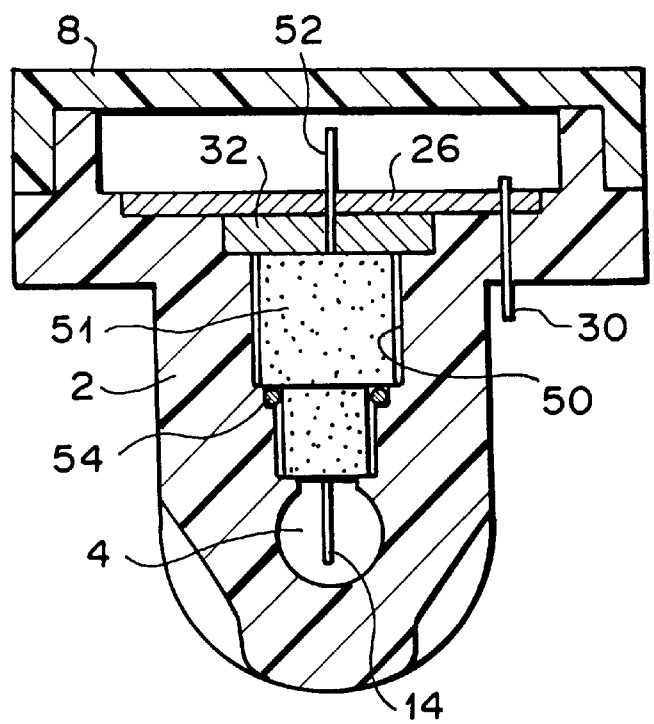
FIG. 8 is a cross-sectional view showing the embodiment of the flow rate sensor according to the present invention, taken perpendicularly to a pipe line for fluid flowing.

FIGS. 7 and 8 are cross-sectional views showing an embodiment of the flow rate sensor according to the present invention. FIG. 7 shows a cross section taken along the fluid flow passage pipe and FIG. 7 shows a cross section taken perpendicularly to the fluid flow passage pipe. In these figures, members having the same functionns as those in FIGS. 1 and 2 are indicated by the same reference numerals. "A" denotes a central axis of the pipe 4.

In this embodiment, connection portions 6a, 6b (e.g. quick coupling mechanism; not shown in detail) for connecting the sensor to the external pipe line are formed at both ends of the casing main body portion 2. The unit retaining portions 50, 60 each has a stepped cylindrical inner surface having a symmetrical axis extending in radial direction of the pipe 4. The flow rate detecting unit 51 having a stepped cylindrical outer surface is retained by the first retaining portion 50, and the temperature detecting unit 61 having a stepped cylindrical outer surface is retained by the second retaining portion 60.

Figure 9:
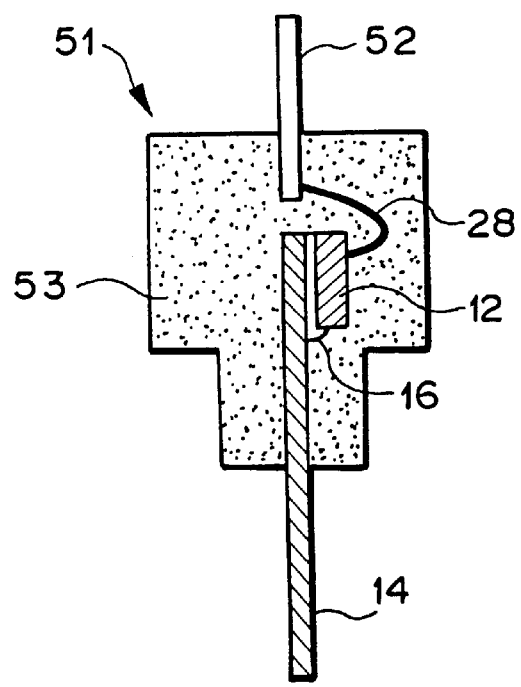
FIG. 9 is a cross-sectional view showing a flow rate sensing unit of the flow rate sensor according to the present invention.

FIG. 9 is a cross-sectional views showing the flow rate detecting unit 51. As shown in FIG. 9, the flow rate detecting unit 51 has a flow rate detector 12, a fin plate 14 serving as a heat transfer member joined to the flow rate detector 12 via an adhesive member 16 having good thermal conduction property, electrode terminals 52, bonding wires 28 electrically connecting electrodes of the flow rate detector 12 to the corresponding electrode terminals 52, and a base portion 53 made of synthetic resin. The base portion 53 is preferably made of synthetic resin having low thermal conductivity (i.e. heat insulation property) and good chemical-resistance and oil-resistance. The base portion 53 has a stepped cylindrical outer surface corresponding to the inner surface of the retaining portion 50. A part of the fin plate 14 extends from the base portion 53 into the pipe line 4, while a part of the electrode terminal 52 extends from the base portion 53 toward the opposite side (outside). That is, the flow rate detector 12, the adhesive member 16, a part of the fin plate 14, a part of the electrode terminal 52 and the bonding wire 28 are sealed with the base portion 53.

The temperature detecting unit 61 differs from the flow rate detecting unit 51 essentially in using the temperature detector instead of the flow rate detector 12. That is, the temperature detecting unit 61 has a fin plate 14' serving as a heat transfer member joined to the temperature detector 22 via an adhesive member having good thermal conduction property, electrode terminals 62, bonding wires electrically connecting electrodes of the temperature detector 22 to the corresponding electrode terminals 62, and a base portion made of synthetic resin. A part of the fin plate 14' extends from the base portion into the pipe line 4, while a part of the electrode terminal 62 extends from the base portion toward the opposite side (outside).

The temperature detector is designed in such a chip structure that a thin-film temperature sensing element for the fluid temperature compensation similar to that of the flow rate detector 12 is formed on a substrate similar to that of the flow rate detector 12. That is, the temperature detector has the same construction as shown in FIG. 3 with the exception that the thin-film heating element 12-3, a pair of electrode layers 12-4, 12-5 and the insulating layer 12-6 are omitted. The temperature detector is connected to the fin plate 14 via a joining member as in the case of the flow rate detector 12.

As shown in FIG. 7, an O-ring 64 serving as a seal member for the pipe 4 is disposed between the outer surface of the flow rate detecting unit 61 and the inner surface of the unit retaining portion 60.

In the accommodating portion 5 of the casing body portion 2, a pressing plate 32 for the flow rate detecting unit 51 and the temperature detecting unit 61, and a wiring board 26 is fixedly disposed thereon. Some electrodes of the wiring board 26 are electrically connected to the electrodes 52 of the flow rate detecting unit 51 by wire bonding etc. (not shown), and also to the electrodes 62 of the temperature detecting unit 61 by wire bonding etc. (not shown). Some other electrodes of the wiring board 26 are connected to external lead wires 30, and the external lead wires 30 extend to the outside of the casing. The external lead wires 30 may be integrally formed on a predetermined position of the casing main body portion 2 in advance, so that the external lead wires 30 are electrically connected to the wiring board 26 when the wiring board 26 is attached to the main body portion 2.

Figure 10:
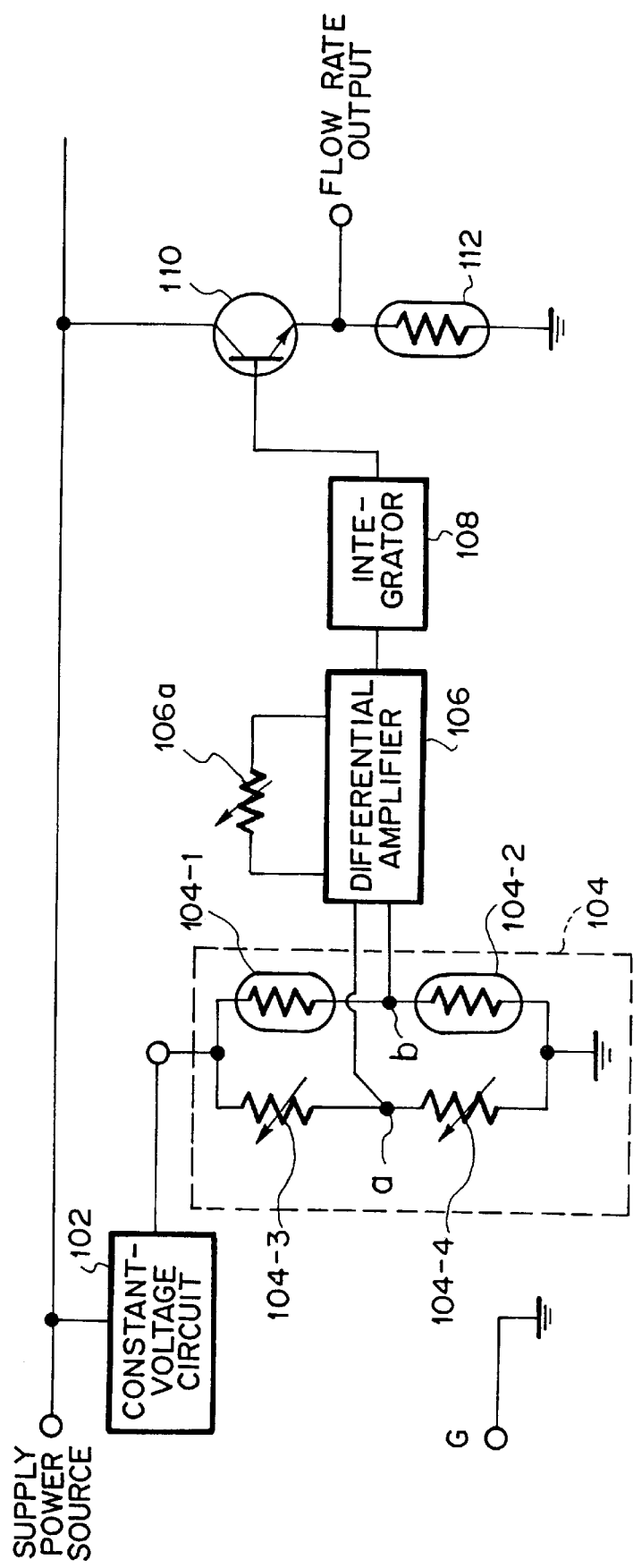
FIG. 10 is a circuit diagram showing the embodiment of the flow rate sensor according to the present invention.

FIG. 10 is a diagram showing the circuit construction of a flow rate sensor according to the present invention. A supply power source is set to +15V(±10%), for example, and it is supplied to a constant-voltage circuit 102. The constant-voltage circuit 102 has an output of 0.1W at +6V (±3%), and the output thereof is supplied to the bridge circuit 104. The bridge circuit 104 contains a flow rate detection temperature sensing element 104-1 (the above 12-7), a temperature compensation temperature sensing element 104-2 and variable resistors 104-3, 104-4.

The voltages at points a and b are applied to a differential amplifying circuit 106. The amplification factor of the differential amplifying circuit 106 is made variable by a variable resistor 106a. The output of the differential amplifying circuit 106 is input to an integrating circuit 108. The differential amplifying circuit 106 whose amplification factor is variable and the integrating circuit 108 function as responsibility setting means as described later.

The supply power source is connected to the collector of an NPN transistor 110, and the emitter of the transistor 110 is connected to a heating element 112 (the above 12-3). The output of the integrating circuit 108 is input to the base of the transistor 110. That is, the supply power source supplies current through the transistor 110 to the heating element 112 (that is, applies a voltage to the heating element 112, makes current flow through the heating element and supplies power), and the voltage to be applied to the heating element 112 is controlled by a divided voltage of the transistor 110. The divided voltage of the transistor 110 is controlled by the output current of the integrating circuit 108 input to the base through the resistor, and the transistor 110 functions as a variable resistor and as heating control means for controlling the heating of the heating element 112.

In the flow rate detector 12, the temperature sensing of the thin-film temperature sensing element 12-7 is carried out in the flow rate detector 12 with being affected by the heat absorption of the fluid to be detected through the fin plate 14 due to the heating of the thin-film heating element 12-3. As a result of the temperature sensing, the difference between the voltages Va, Vb at the points a, b of the bridge circuit 104 shown in FIG. 10 is obtained.

The temperature of the flow rate detection temperature sensing element 104-1 is varied in accordance with the flow rate of the fluid, resulting in variation of the value of (Va-Vb). By setting the resistance values of the variable resistors 104-3, 104-4 to proper values in advance, the value of (Va-Vb) can be set to zero when the flow rate of the fluid is equal to a desired value serving as a reference. At this reference flow rate, the output of the differential amplifying circuit 106 is equal to zero, and the output of the integrating circuit 108 is fixed, so that the resistance value of the transistor 110 is also fixed. In this case, the divided voltage to be applied to the heating element is also fixed, and the flow rate output at this time indicates the above reference flow rate.

If the flow rate of the fluid is increased or reduced from the reference flow rate, the output of the differential amplifying circuit 106 is varied in polarity (which differs in accordance with the positive/negative sign of the resistance-temperature characteristic of the flow rate detection temperature sensing element 104-1) and magnitude in accordance with the value of (Va-Vb), resulting in variation of the output of the integrating circuit 108. The variation speed of the output of the integrating circuit 108 can be adjusted by setting the amplification factor of the differential amplifying circuit 106 with the variable resistor 106a. The response characteristic of the control system can be set by the integrating circuit 108 and the differential amplifying circuit 106.

When the flow rate of the fluid increases, the temperature of the flow rate detection temperature sensing element 104-1 is reduced, and thus the integrating circuit 108 supplies the base of the transistor 110 with such a control input as to reduce the resistance of the transistor 110 so that the heating value of the heating element 112 is increased (that is, the current to be supplied to the heating element 112 is increased).

On the other hand, when the flow rate of the fluid is reduced, the temperature of the flow rate detection temperature sensing element 104-1 is increased. Therefore, the integrating circuit 108 supplies the base of the transistor 110 with such a control input as to increase the resistance of the transistor 110 so that the heating value of the heating element 112 is reduced (that is, the current to be supplied to the heating element 112 is reduced).

As described above, the heat of the heating element 112 is controlled to be fed back so that the temperature detected by the flow rate detection temperature sensing element 104-1 is equal to a target value irrespective of the variation of the flow rate of the fluid at all times (if occasion demands, the polarity of the output of the differential amplifying circuit 106 is properly inverted in accordance with the positive/negative sign of the resistance-temperature characteristic of the flow rate detection temperature sensing element 104-1). At this time, the voltage to be applied to the heating element 112 is matched with the flow rate of the fluid and thus it is picked up as the output of the flow rate.

According to the above embodiment, the temperature of the flow rate detection temperature sensing element 104-1 around the heating element 112 can be kept to a substantially fixed value irrespective of the flow rate of the fluid to be detected, so that the flow rate sensor is not degraded with time lapse and also occurrence of ignition and explosion of the inflammable fluid to be detected can be prevented.

Further, in this embodiment, no constant-voltage circuit is required to the heating element 112, and thus there is an advantage that it is sufficient to use a low-output constant-voltage circuit 102 for the bridge circuit 104. Therefore, the heating value of the constant-voltage circuit can be reduced, and the flow rate detection precision can be kept excellent even if the flow rate sensor is miniaturized.

In this embodiment, the base portion 53 of the flow rate detecting unit and the base portion of the temperature detecting unit are each made of synthetic resin having a thermal conductivity $\lambda$ of 0.7 [W/m.K] or less such as epoxy resin containing 40% by weight of amorphous silica ($\lambda$=0.60). In such a case, the flow rate detection or the fluid temperature detection can be performed with little influence of the environmental temperature.

The base portion 53 of the flow rate detecting unit and the base portion of the temperature detecting unit are each preferably made of synthetic resin having a thermal conductivity $\lambda$ of 0.4[W/m.K] or less such as epoxy resin containing 20% by weight of amorphous silica ($\lambda$=0.33). In such a case, the flow rate detection or the fluid temperature detection can be performed with less influence of the environmental temperature, and additionally the flow rate detection can be performed with quick response when the flow rate is varied.

Figure 11:
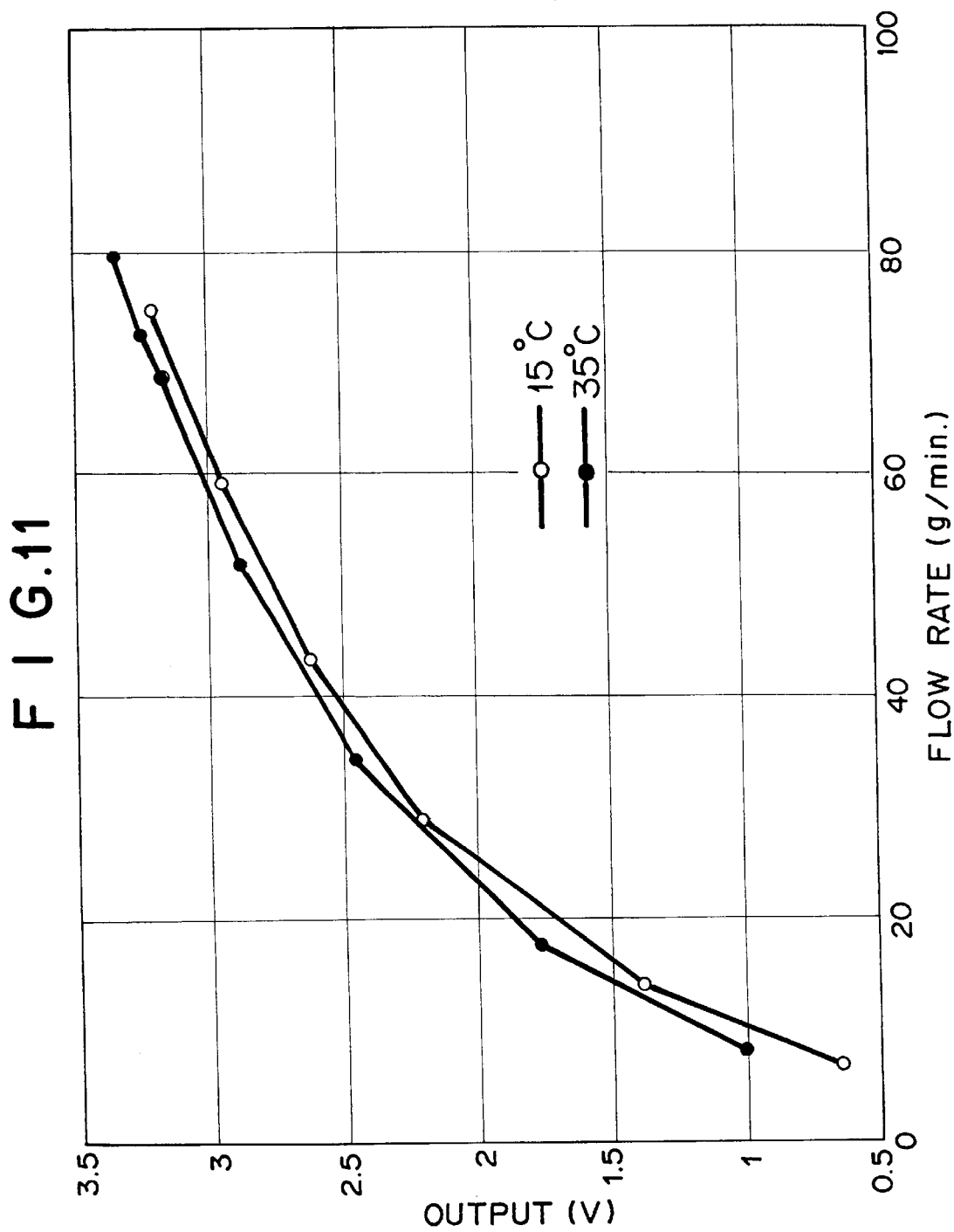
FIG. 11 is a graph showing a relationship between a flow rate and an output voltage in the embodiment of the flow rate sensor according to the present invention.
Figure 12:
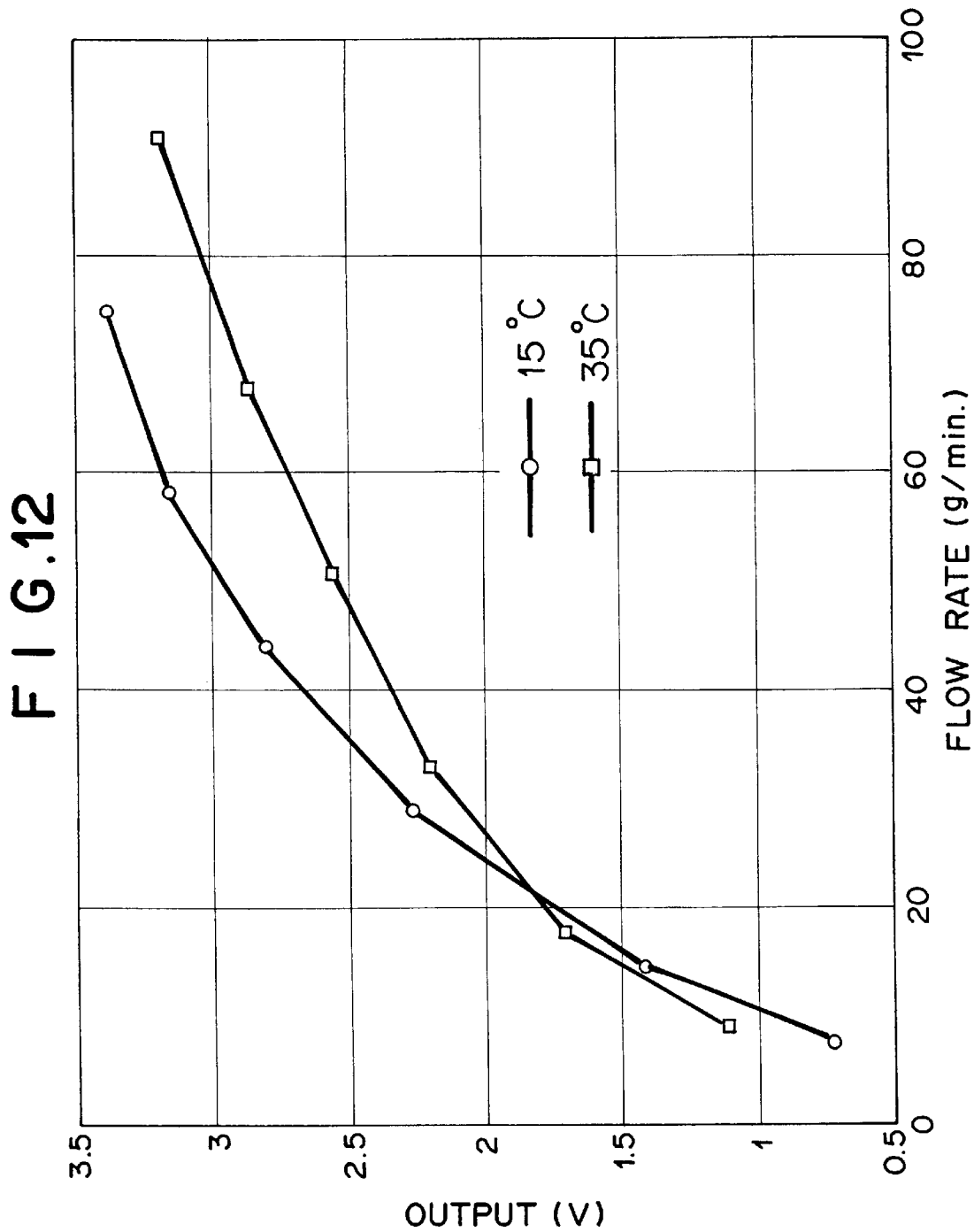
FIG. 12 is a graph showing a relationship between a flow rate and an output voltage in a comparative flow rate sensor.

FIG. 11 is a graph showing a relationship between the flow rate and the output voltage in the flow rate sensor at the fluid temperature of 25° C. Kerosene was used as the fluid to be detected. The inner diameter of the fluid flowing passage pipe was set to 4 mm$\phi$. Epoxy resin containing 40% by weight of amorphous silica ($\lambda$=0.60) was used as material of both the base portion 53 of the flow rate detecting unit and the base portion of the temperature detecting unit. The detection was performed under the environmental temperatures of 15° C. and 35° C. FIG. 12 is a graph showing the same relationship as FIG. 11 with the exception that it was obtained under the condition where the epoxy resin containing 60% by weight of amorphous silica ($\lambda$=0.88) was used as material of both the base portion 53 of the flow rate detecting unit and the base portion of the temperature detecting unit. As apparent from the comparison of FIG. 11 to FIG. 12, the flow rate detection can be performed with smaller variation of the output voltage due to the variation of the environmental temperature in the case of FIG. 11 as compared with the case of FIG. 12.

FIG. 13 is a graph showing a variation of the output voltage with time lapse in the flow rate sensor when the actual flow rate was varied from 20 cc/min to 80 cc/min and thereafter. Kerosene was used as the fluid to be detected. The inner diameter of the fluid flowing passage pipe was set to 4 mm$\phi$. The detection was performed The detection was performed in two cases (X, Y) where epoxy resin containing 20% by weight of amorphous silica ($\lambda$=0.33) for the case X and epoxy resin containing 40% by weight of amorphous silica ($\lambda$=0.60) for the case Y were used as material of both the base portion 53 of the flow rate detecting unit and the base portion of the temperature detecting unit. It is apparent that the flow rate detection can be performed with higher responsibility and smaller detection error in the case of X as compared with the case of Y.

According to the above embodiment, the flow rate detecting base portion for sealing the flow rate detector is made of synthetic resin having low thermal conductivity, so that the adverse effect of the thermal transfer between the outside and the flow rate detector on the flow rate detection can be suppressed. Therefore, the flow rate of the fluid in the pipe can be accurately and stably detected under wide environmental temperature range.

A preferred embodiment of the flow rate sensor and flow rate detecting apparatus is described hereunder with reference to FIGS. 14A, 14B, 15 to 20.

As shown in FIGS. 14A, 14B, the flow rate sensor 201 comprises a flow rate detector 202, a fin plate 203, an output terminal 204 and a coating member 205. As shown in FIG. 15, the flow rate detector 206 is designed in such a chip structure that an insulating layer 207, a thin-film heating element 208, electrode layers 209, 210, an insulating layer 211, a thin-film temperature sensing element 212 and an insulating layer 213 are laminated in this order on a substrate 206.

Figure 16:
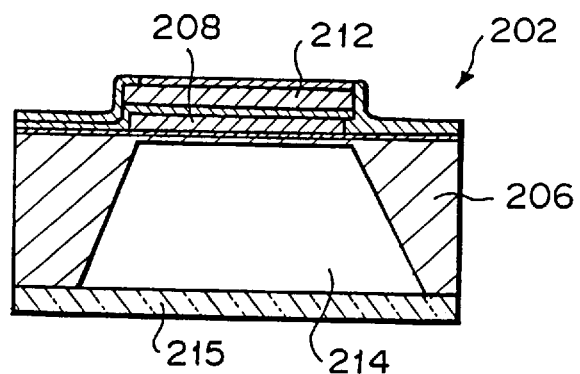
FIG. 16 is a longitudinal sectional view showing the flow rate detector of the flow rate sensor.

The substrate 206 is formed of a rectangular plate of silicon, alumina or the like which has a thickness of 600 $\mu$m and a size of about 2×3 mm. As shown in FIG. 16, a recess portion 214 having a depth of 550 $\mu$m is formed by etching or the like from the opposite surface of the substrate to the surface on which the heating element 208 and the temperature sensing element 212 are laminated. The depth of the recess portion 214 is not specifically restricted, however, it is preferably set so as to be close to the thickness of the substrate 206 as long as the strength thereof can be maintained. The inner diameter of the recess portion 214 is also not specifically restricted, however, it is preferably set so as to be greater than the size of the heating element 208 and the temperature sensing element 212. A glass plate 215 having a thickness of 50 to 200 $\mu$m is fixed to the opposite surface of the substrate 206 to the surface on which the heating element 208 and the temperature sensing element 212 are laminated to completely seal the recess portion 214.

The heating element 208 is formed of cermet which has a thickness of about 1 $\mu$m and is designed in a desired shape by patterning, and the electrode layers 209, 210 are formed of nickel at a thickness of about 0.5 $\mu$m or formed of a lamination film obtained by laminating a gold film of about 0.5 $\mu$m on a nickel film of about 0.5 $\mu$m. The temperature sensing element 212 has a thickness of about 0.5 to 1 $\mu$m and is formed of a metal resistant film of platinum, nickel or the like which is patterned in a desired shape, for example, a meandering shape and has a large and stable resistance-temperature coefficient, or an NTC thermistor of manganese oxide. The insulating layers 207, 211, 213 are formed of $SiO_2$ at a thickness of about 1 μm.

The fin plate 203 is formed of material having excellent thermal conductivity such as copper, duralumin, copper-tungsten alloy or the like, and it is a rectangular thin plate of 200 μm in thickness and about 2 mm in width.

As shown in FIG. 14B, the flow rate detector 202 is fixed to the surface of the upper end portion of the fin plate 203 through a joint member 216 of silver paste or the like so that the surface of the flow rate detector 202 on which the heating element 208 and the temperature sensing element 212 are laminated is confronted to the surface of the upper end portion of the fin plate 203. The flow rate detector 202 is connected to the output terminal 204 by a bonding wire 217, and the flow rate detector 202, the upper half portion of the fin plate 203 and the lower half portion of the output terminal 204 are coated with the coating member 205 formed by molding.

In the flow rate sensor 201, the recess portion 214 is formed in the substrate 206 of the flow rate detector 202 to form an air layer having a high adiabatic effect in the recess portion 214, and the flow rate detector 202 is fixed to the surface of the upper end portion of the fin plate 203 while the surface of the flow rate detector 202 on which the heating element 208 and the temperature sensing element 212 are laminated is confronted to the surface of the upper end portion of the fin plate 203, thereby reducing the contact area between the coating member 205 and the heating element 208 or the temperature sensing element 212 at maximum, so that the heating value possessed by the temperature sensing element 212 or the heating value transferred through the fin plate 203 can be suppressed from flowing out of or flowing into the coating member 205 at maximum.

Accordingly, the sensitivity of the flow rate sensor 201 is not reduced even when the specific heat of the fluid is small, even when the flow rate is small, etc.

Various methods may be used to manufacture the flow rate sensor 201, and the fin plate 203 and the output terminal 204 may be unified.

Figure 17:
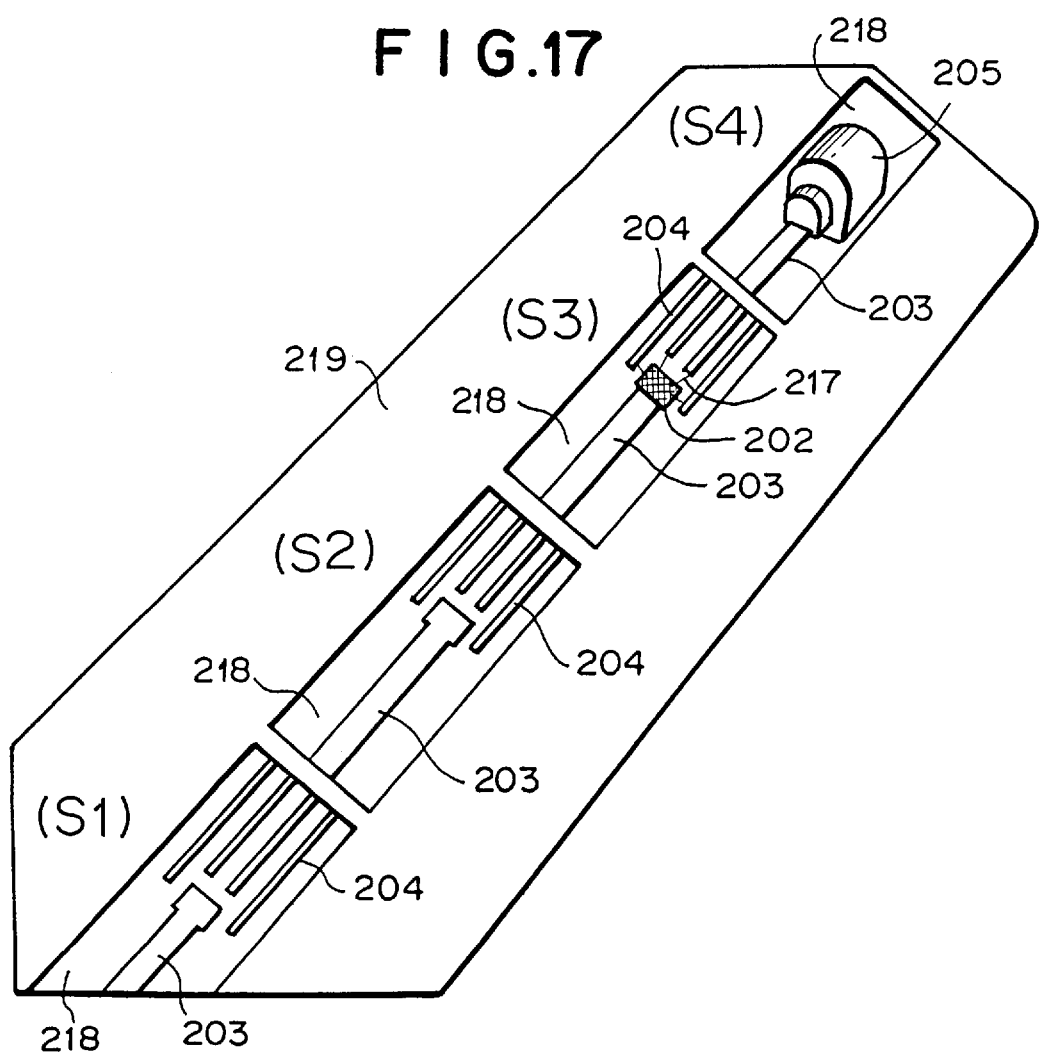
FIG. 17 is an explanatory diagram showing a manufacturing process of the flow rate sensor.
Figure 18:
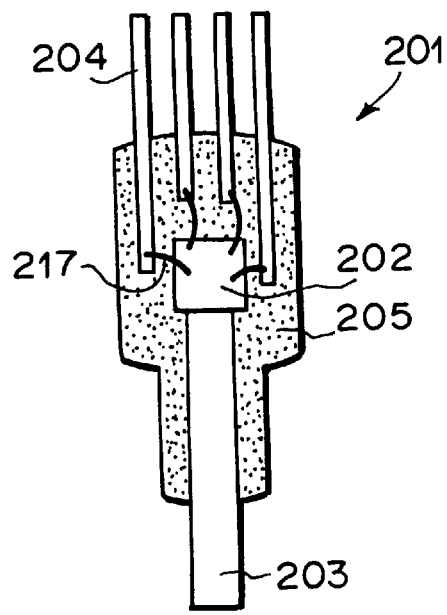
FIG. 18 is a cross-sectional view showing a flow rate sensor manufactured by the process of FIG. 17.

For example, the following process may be adopted. As shown in FIG. 17, there are successively carried out a step of etching a plate 219 to form a plate base member 218 having a predetermined shape (S1), a step of conducting silver plating treatment on a portion to which the flow rate detectors 202 will be joined (S2), a step of coating silver paste on the portion to fix the flow rate detector 202 to the portion, connecting the flow rate detector 202 and the output terminal 204 by a bonding wire 217 and conducting nickel plating on the portion corresponding to the fin plate 203 (S3), and a step of molding the flow rate detector 202, the upper half portion of the fin plate 203 and the lower half portion of the output terminal 204 with epoxy resin to form the coating member 221 (S4), thereby obtaining the flow rate sensor 201 as shown in FIGS. 18.

Figure 20:
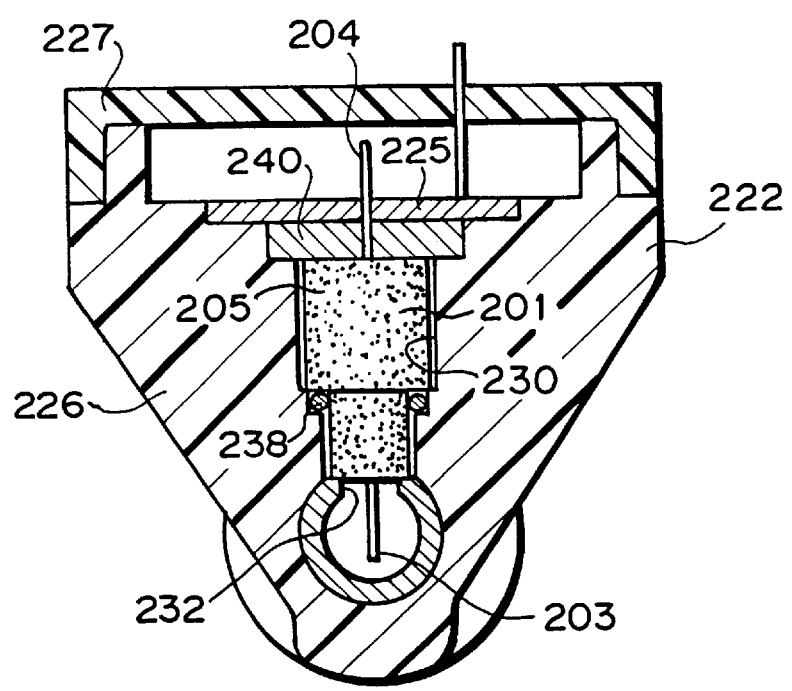
FIG. 20 is a cross-sectional view showing the flow rate detecting apparatus including the flow rate sensor.

As shown in FIGS. 19 and 20, the flow rate detecting device 221 comprises a casing 222, a flow passage pipe 223, the flow rate sensor 201, a temperature sensor 224, a flow rate detecting circuit board 225, etc.

The casing 222 is formed of synthetic resin such as vinyl chloride resin or the like, and it comprises a main body portion 226 and a lid portion 227 detachably attached thereto. Both the end portions of the main body portion 226 are designed as connection portions 228 to be connected to an external pipe line, and the fluid passage pipe 223 is disposed so as to penetrate through the main body portion 226.

A sensor insertion space 229 is formed at the upper portion of the main body portion 226, and sensor insertion holes 230, 231 are formed so as to extend from the sensor insertion space 229 to the flow passage pipe 223.

The flow passage pipe 223 is a circular pipe formed of metal such as copper, iron, stainless steel or the like, and opening portions 232, 233 are formed so as to face the sensor insertion holes 230 and 231.

The temperature sensor 224 comprises a temperature detector (the same as the temperature detector 22), a fin plate 235, an output terminal 236, a coating member 237, etc., and it has the same construction as the flow rate detector 202 except that it does not have the heating element 208, the electrode layers 209, 210 and the insulating layer 211 of the flow detector 202. The same method as the flow rate sensor 201 may be adopted as the method of manufacturing the temperature sensor 224.

The flow rate sensor 201 and the temperature sensor 224 are fitted into the sensor insertion holes 230 and 231 through the sensor insertion space 229 of the casing 222. The lower half portions of the fin plates 203 and 235 are located in the flow passage pipe 223 so as to penetrate through the opening portions 232 and 233 of the flow passage pipe 223. The lower ends of the fin plate 203, 235 are set to extend to positions lower than the axial line of the flow passage pipe 223 when the sensors are fitted. O-rings 238 and 239 are interposed between the flow rate sensor 201 and the sensor insertion hole 230 and between the temperature sensor 224 and the sensor insertion hole 231 respectively, thereby preventing fluid from leaking through the gaps therebetween.

After the flow rate sensor 201 and the temperature sensor 224 are fitted into the sensor insertion holes 230 and 231, a sensor press plate 240 is inserted into the sensor insertion space 229 to press the upper surfaces of the coating members 205, 237 of the flow rate sensor 201 and the temperature sensor 224, and a flow rate detection circuit board 225 is mounted on the sensor press plate 240.

The flow rate detecting circuit board 225 is electrically connected to the output terminals 204 and 236 of the flow rate sensor 201 and the temperature sensor 224 (connection is not shown), and the flow rate detecting circuit described with reference to FIG. 4 is constructed as a whole. That is, in the flow rate sensor 201, the quantity of heat obtained by subtracting the quantity of heat discharged to the fluid through the fin plate 203 from the heating value of the heating element 208 is detected by a temperature sensing element 212. Further, in the temperature sensor 224, the heating value owned by the fluid through the fin plate 235 is detected by the temperature sensing element to carry out the fluid temperature compensation, whereby the flow rate of the fluid can be detected with high precision.

In the flow rate sensor 201 of the present invention, the flow rate detector 202, the upper half portion of the fin plate 203 and the lower half portion of the output terminal 204 are coated with a coating member 205 based on molding. Therefore, the flow rate sensor can be surely inserted into the sensor insertion holes 230, 231, and there can be suppressed such a risk that the heat transferred through the fin plate 203 leaks to the casing 222 through the metal flow passage pipe 223 or the heat is transferred from the casing 222 to the fin plate 203 due to an incomplete sealing state.

From this viewpoint, the sensitivity of the flow rate sensor 201 can be prevented from being lowered even when the specific heat of the fluid is small, the flow rate is small or the like.

Further, in the flow rate sensor 201 of the present invention, the flow rate detector 202, the upper half portion of the fin plate 203 and the lower half portion of the output terminal 204 are coated and unified into one body by the coating member 205 based on molding, and the temperature sensor 224 is similar to the case of the flow rate sensor 201. Thus, the sensors are merely fitted into the sensor insertion holes 230, 231 formed in the casing 222. Therefore, the installation of the sensors 201, 224 into the casing 222 can be extremely easily performed. In addition, it can be kept under a stable fixed state and has high durability.

Figure 21:
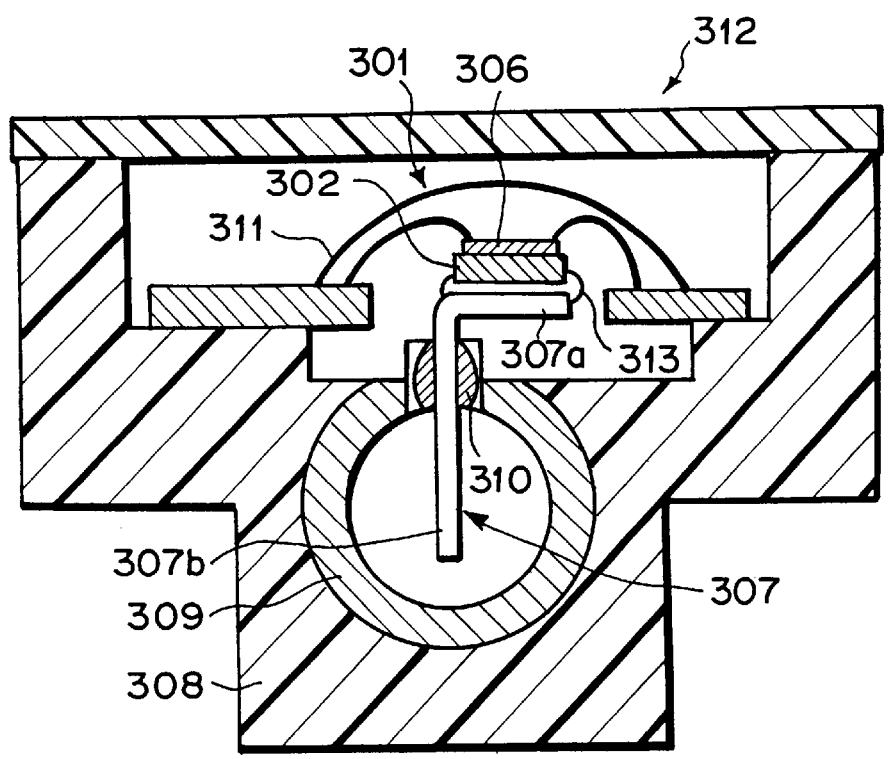
FIG. 21 is a cross-sectional view showing a flow rate sensor comprising a fin plate and a flow rate detector mounted thereon and the flow rate detecting apparatus including the flow rate sensor.

FIG. 21 is a cross-sectional view showing a flow rate detecting apparatus for reference, and the flow rate detecting apparatus shown in FIG. 21 has been developed by the inventors of the present invention.

The flow rate detecting apparatus 312 uses a flow rate sensor 301 including a flow rate detector 306 which comprises a thin-film heating element and a thin-film temperature sensing element laminated on a substrate 302 through an insulating layer, and an L-shaped fin plate 307 having a horizontal plate portion 307a on which the flow rate detector 306 is mounted. In the casing 308, glass 310 is filled in the gap between the vertical plate portion 307b of the fin plate 307 and the opening portion of the flow passage pipe 309 to seal the gap, and the flow rate detector 306 and the overall horizontal plate portion 307a of the fin plate 307 are coated, sealed and fixed by synthetic resin 211, thereby forming the flow rate detecting apparatus 312.

Such problems as discharge of the quantity of heat to the outside or supply of the quantity of heat from the outside, variation of the flow rate on the cross-section of the pipe and reduction of the measurement precision of the flow rate due to an outside temperature environmental effect or the like can be greatly overcome by using the flow rate sensor 301 and the flow rate detecting apparatus 312.

However, the flow rate sensor 301 needs works of joining the flow rate detector 306 to the horizontal plate portion 307a of the fin plate 307 by a joint member 313, filling the glass 310 in the gap between the vertical plate portion 307b of the fin plate 307 and the opening portion of the flow passage pipe 309 to seal the gap, coating and sealing the flow rate detector 306 and the overall horizontal plate portion 307a of the fin plate 307 with the synthetic resin 311. Therefore, the installation work of the flow rate sensor 301 into the casing 308 is cumbersome and also the fixing state thereof is unstable, so that a problem may occur in durability.

The present invention can also solve the above problem, and provides a flow rate sensor and a flow rate detecting apparatus which can be easily installed into a casing and has sufficiently high durability under a stable fixed state.

According to the flow rate sensor of the present invention, the quantity of heat discharged from each part of the flow sensor to the casing and the outside can be extremely suppressed, and the flow rate can be measured with high precision even when the specific heat of fluid is small, the flow rate of the fluid is small or the like.

Next, preferable embodiments of a flow rate sensor and a temperature sensor of the present invention will be described with reference to FIGS. 22 to 24, 25A, 25B, 26A, 26B, 27 to 30.

A flow rate sensor 401 shown in FIGS. 22 and 23 comprises a flow rate detector 402, a fin plate 403, an output terminal 404 and a housing 405.

The flow rate detector 402 is formed by successively forming and laminating a thin-film temperature sensing resistor 407, an interlayer insulating layer 8, a thin-film heating element 409, heating element electrodes 410, 411 and a protection film 412 on a substrate 406 having a rectangular plate which is formed of silicon, alumina or the like and has a thickness of 400 μm and a square of about 2 mm as shown in FIG. 24. Reference numeral 413 represents bonding pads to coat the end edge portions of the temperature sensing resistor 407 to be connected to bonding wires and the heating element electrodes 410, 411 by thin film of gold (Au) or platinum (Pt).

The temperature sensing resistor 407 comprises a metal resistive film of platinum or the like which has a film thickness of about 0.5 to 1 μm and a large and stable temperature coefficient and is patterned in a desired shape such as a meandering shape, or an NTC thermistor of manganese oxide.

The interlayer insulating layer 408 and the protection film 412 are formed of $SiO_2$ at a thickness of about 1 μm.

The heating element 409 comprises a resistor which has a film thickness of about 1 μm and is patterned in a desired shape, and it is preferably formed of nickel (Ni), Ni-Cr or Pt, more preferably formed of cermet material such as $Ta-SiO_2$, $Nb-SiO_2$ or the like. The heating element electrodes 410, 411 are formed of Ni film having a film thickness of about 1 μm or a combination of the Ni film and Au film which is laminated on the Ni film and has a film thickness of about 0.5 μm.

The bonding pad 413 is formed of Au of 0.2×0.15 mm in longitudinal and lateral dimensions and about 0.1 μm in thickness.

The fin plate 403 comprises a rectangular thin plate of 200 μm in thickness and about 2 mm in width which is formed of material having excellent thermal conductivity such as copper, duralmin, copper-tungsten alloy or the like. The fin plate 403 is designed in an inverse L-shape so that the upper end portion of the rectangular thin plate is substantially vertically bent by a proper length. The flow rate detector 402 is fixed to the top surface of the bent portion through a joint member 414 such as silver paste or the like.

The output terminal 404 is a linear thin plate of 200 μm in thickness which is formed of material having high conductivity such as copper or the like.

The housing 405 comprises a housing main body 415 and a lid 416, and they are formed of hard resin having high chemical resistance and high oil resistance, and more preferably resin having low thermal conductivity such as epoxy resin, polybutylene terephthalate (PBT), polyphenylene sulfide (PPS) or the like.

The housing main body 415 is designed in such a shallow cylindrical shape that the upper portion thereof is recessed and the inside thereof is set as a hollow recess portion 417, and a fitted portion 415a which is obtained by cutting out the housing main body 415 in a recess shape from the edge portion of the peripheral wall thereof to the top portion thereof and to which the lid 416 is fitted is formed at the edge portion of the peripheral wall. Further, a projecting step portion 415b which is projected in a cylindrical shape is provided to the bottom surface of the housing main body 415. The hollow recess portion 417 comprises a large-diameter recess portion 417a obtained by circularly holing the inside of the housing main body 415, and a small-diameter recess portion 417b obtained by further circularly holing the center portion of the bottom portion of the large-diameter recess portion.

The lid 416 is designed like a dish which is put face down (the recess portion thereof faces downwardly), and a downwardly-projecting fitting portion 416a which is fitted to the fitted portion of the housing main body is provided at the peripheral edge of the lid 416 so as to be mounted on the top surface of the housing main body 415.

As shown in FIG. 23, in the housing main body 415, the fin plate 403 having the flow rate detector 402 fixed to the upper portion thereof is inserted in the small-diameter recess portion 417b so that the lower end portion thereof penetrates through the projecting step portion 415b and projects to the outside of the housing while the bent portion of the upper portion thereof is brought into contact with the bottom portion of the large-diameter recess portion 417a and supported by the bottom portion. Four output terminals 404 are provided to the housing main body 415 so that one half portion of each output terminal penetrates through the side wall of the housing main body and horizontally projects to the outside of the housing while the other half portion of each output terminal is joined to and supported by the bottom portion of the large-diameter recess portion 417a. In addition, each output terminal 404 and the flow rate detector 402 are bonded to each other by a bonding wire 418.

The lid 416 is put on the housing main body 415 in which the respective parts are arranged as described above, and the lid 416 and the housing main body 415 are fixed to each other by adhesive agent or impregnation to seal the inside of the housing 405, thereby forming the flow rate sensor 401 of this embodiment.

According to the flow rate sensor 401 of this embodiment, the hollow recess portion 417 of the housing main body 415 is hermetically closed by the lid 416 to form a cavity portion in the housing 405, and the flow rate detector 402 is accommodated in the cavity portion. Accordingly, a gas layer (air layer) having high adiabatic effect is formed between the surrounding of the flow rate detector 402 and the inner peripheral surface of the housing 405, the surface portion of the fin plate 403 and the output terminal 404 (containing the connection portions thereof with the flow rate detector 402) are exposed into the hollow recess portion 417, and the contact area between the housing 405 and each of the above elements is reduced, so that the quantity of heat transferred from the outside of the sensor through the housing 405 to the flow rate detector 402 can be extremely reduced. In order to prevent dew condensation, dried air, more preferably nitrogen gas, argon gas or the like is preferably filled in the gas layer.

Accordingly, the effect of the flow-in/out of the quantity of heat between the outside air and the flow rate sensor 401 is suppressed, and the measurement error due to the flow-in of the quantity of heat from things other than the fluid is reduced, so that the measurement precision of the flow rate is enhanced. Therefore, even when the specific heat of the fluid is small or the flow rate is small, the flow rate can be measured with precision.

The flow rate sensors 401 shown in FIGS. 25A and 25B and FIGS. 26A and 26B are different from the above embodiment in the form of the housing 405.

Figure 25A:
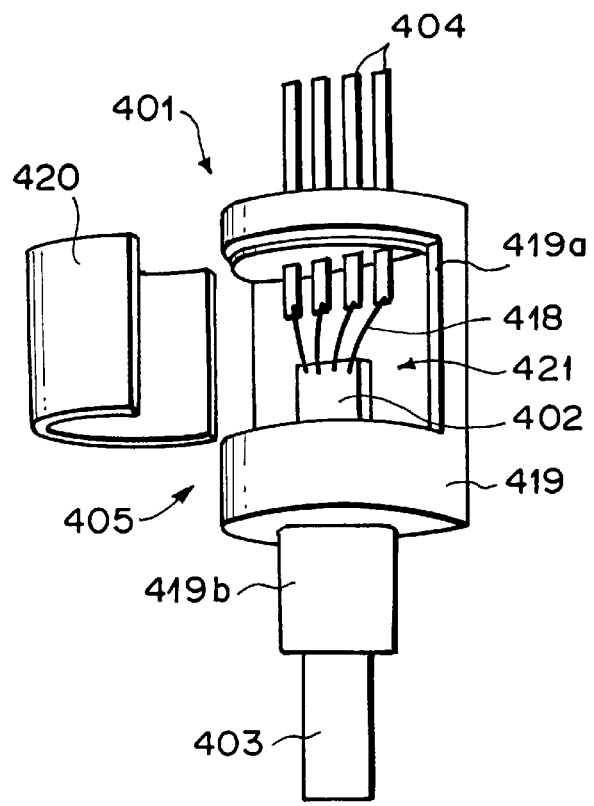
FIG. 25A is an exploded perspective view showing another embodiment of the flow rate sensor according to the present invention.
Figure 25B:
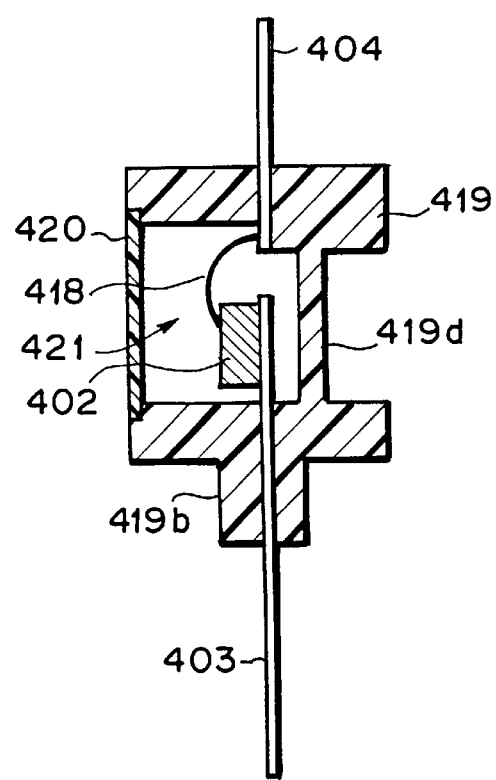
FIG. 25B is a cross-sectional view showing the flow rate sensor of FIG. 25A.

The housing 405 shown in FIGS. 25A and 25B comprises a housing main body 419 and a lid 420 as in the case of the above embodiment. The housing main body 419 is provided with a hollow recess portion 421 obtained by cutting out the central portion of the cylinder of the housing main body 419 in a recess form from one side portion to the other side portion, and a notched portion 419d is formed at the outer peripheral surface portion of the back surface of the housing main body 419 to have proper width and depth in order to reduce the thermal contact area between the housing main body 419 and a casing 452 described later. The lid 420 comprises a curved plate which can be joined to the peripheral surface of the housing main body, and the lid 420 is mounted on the peripheral surface of the housing main body 419 to close the hollow recess portion 421.

A fitting step portion 419a for fitting the lid 420 to the housing main body 419 is provided at the inside of the peripheral surface of the housing main body 419, and a projecting step portion 419 which is formed in a cylindrical shape so as to project downwardly is provided at the bottom surface of the housing main body 419.

Figure 26A:
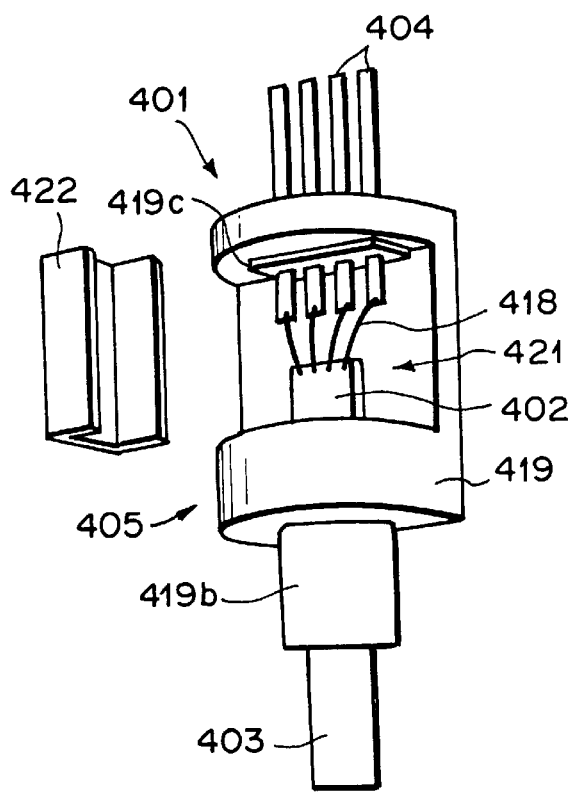
FIG. 26A is an exploded perspective view showing still another embodiment of the flow rate sensor according to the present invention.
Figure 26B:
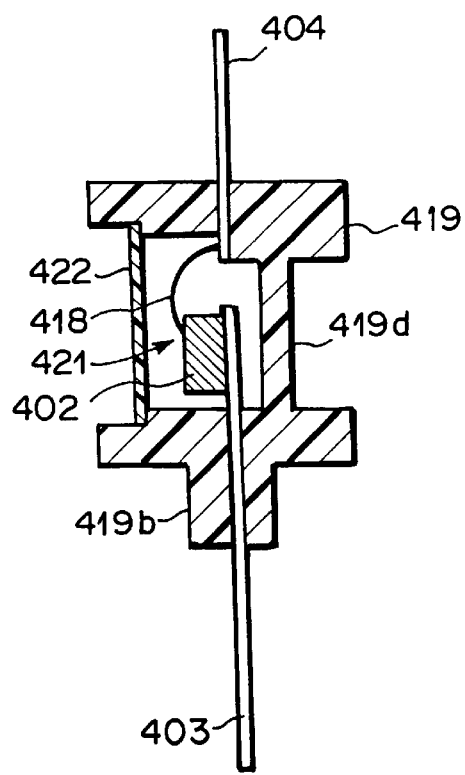
FIG. 26B is a cross-sectional view showing the flow rate sensor of FIG. 26A.

The housing 405 shown in FIGS. 26A and 26B has the same housing main body 419 as the above embodiment, and a lid 422 comprising a bent plate which is bent in a substantially U-shape. The lid 422 is mounted on the housing main body 419 to close the hollow recess portion 421. In this case, a fitting step portion 419c for fitting the lid 422 to the housing main body 419 is provided along the peripheral surface of the lid at the inside of the peripheral surface of the housing main body 419. Further, a notched portion 419d is formed at the outer peripheral surface portion of the back surface of the housing main body 419 to have proper width and depth as in the case of the embodiment shown in FIGS. 25A and 25B.

In these embodiments, a stripe-shaped fin plate 403 which is not bent in an L-shape is used. The fin plate 403 is inserted through the lower portion of the hollow recess portion 421 in the housing main body 419, the flow rate detector 402 is fixed to the upper end portion of the fin plate 403, and the lower end portion of the fin plate 403 is disposed so as to penetrate through the projecting step portion 419b and project to the outside of the housing. The four output terminals 404 are disposed so that the upper end portions thereof penetrate through the upper portion of the hollow recess portion 421 and project to the outside of the housing while the lower end portions thereof are disposed in the hollow recess portion 421, and each output terminal 404 and the flow rate detector 402 are connected to each other through a bonding wire 418.

The lid 420 or the lid 422 is fitted to the side surface of the housing main body 419 in which the respective elements are arranged, and they are fixed to each other by adhesive agent or impregnation to seal the inside of the housing 405, thereby forming the flow rate sensor 401.

In the flow rate sensors 401 of these embodiments, a cavity portion is formed in the housing 405 through the covering of the lid 420 or 422 on the housing main body 419, and the flow rate detector 402 is accommodated in the cavity portion. Therefore, the effect of the flow-in/out of the quantity of heat between the outside air and the flow rate sensor 401 can be reduced by the adiabatic effect of an air layer formed around the flow rate detector 402, thereby enhancing the measurement precision of the flow rate.

Figure 29:
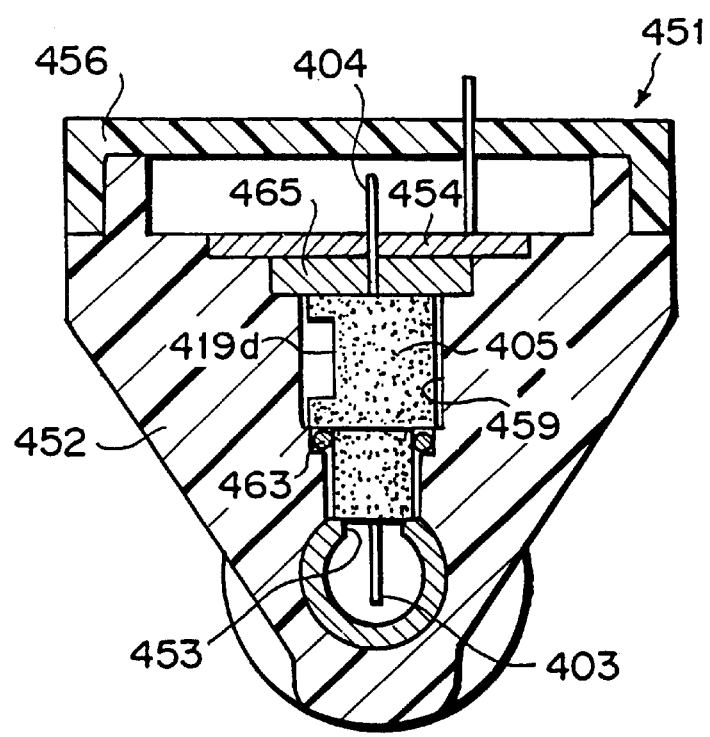
FIG. 29 is a cross-sectional view showing the flow rate detecting apparatus.

Further, a notch portion 419d is provided at the outer peripheral surface portion of the housing main body 419, so that it is hard to transfer heat from the surrounding of the sensor and thus the adiabatic effect is enhanced. That is, under the state that the sensor is mounted on the flow rate detecting apparatus, the notch portion 419d is not brought into contact with the peripheral surface of the sensor insertion hole 459, and the portion of the notch portion 419d is set as a void as shown in FIG. 29, so that the flow-in/out of heat from the casing 452 to the housing main body 419 is suppressed by the air layer and it is cooperated with the adiabatic effect of the cavity portion formed in the housing 405 to reduce the measurement error.

The notch portion 419d may be designed in a proper size and proper shape and located at a proper position in conformity with the size, shape, etc. of the housing main body 419, and it may be provided to the outer peripheral surface of the housing main body 415 shown in FIGS. 22, 23.

Figure 27:
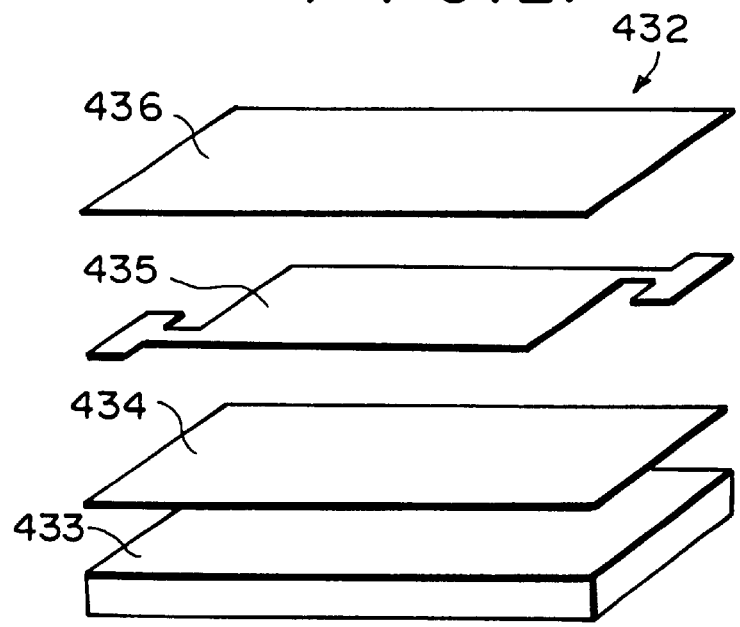
FIG. 27 is an exploded perspective view showing a temperature detector used in the flow rate sensor according to the present invention.
Figure 28:
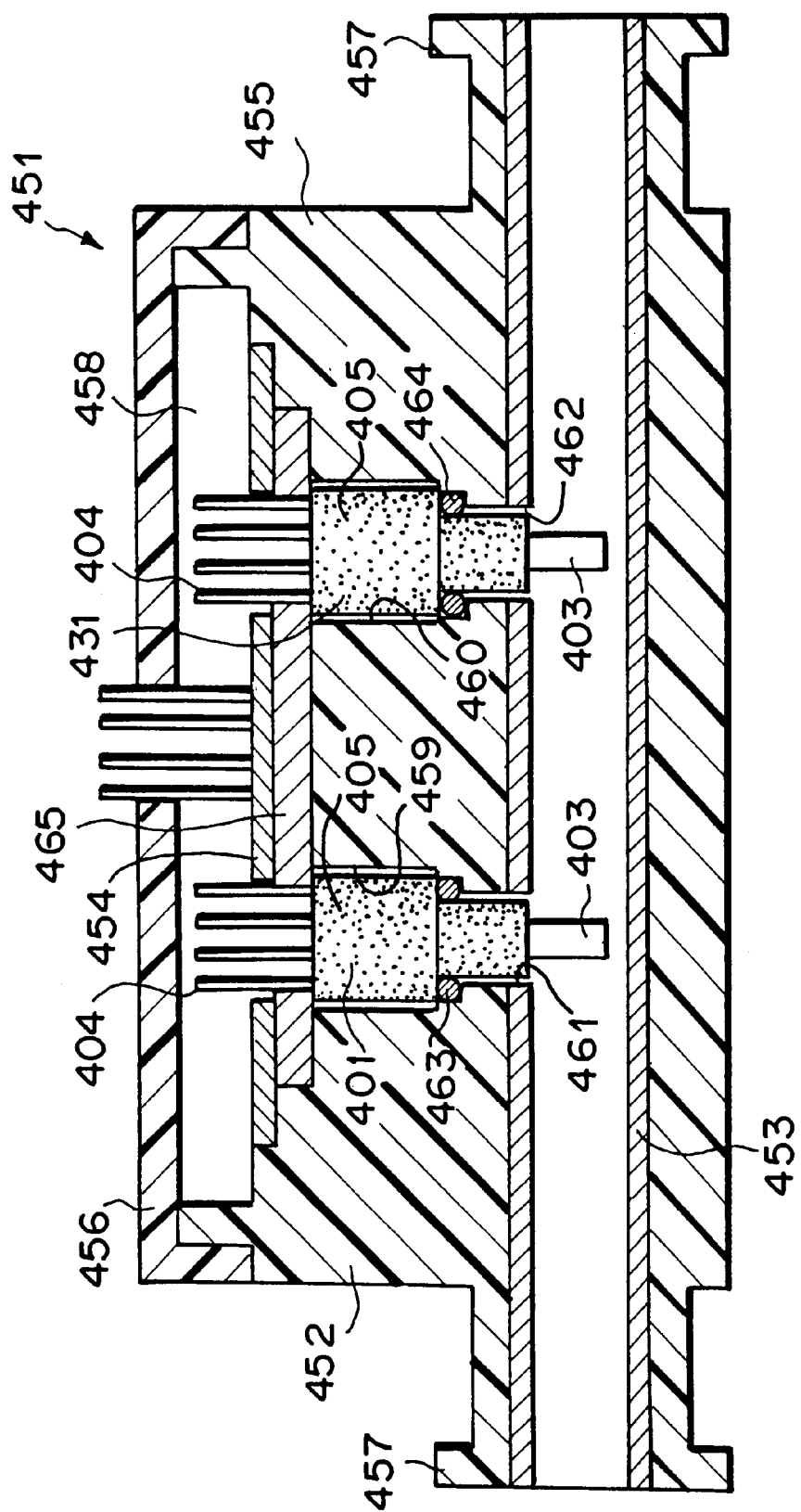
FIG. 28 is a cross-sectional view showing the flow rate detecting apparatus according to the present invention.
Figure 31A:
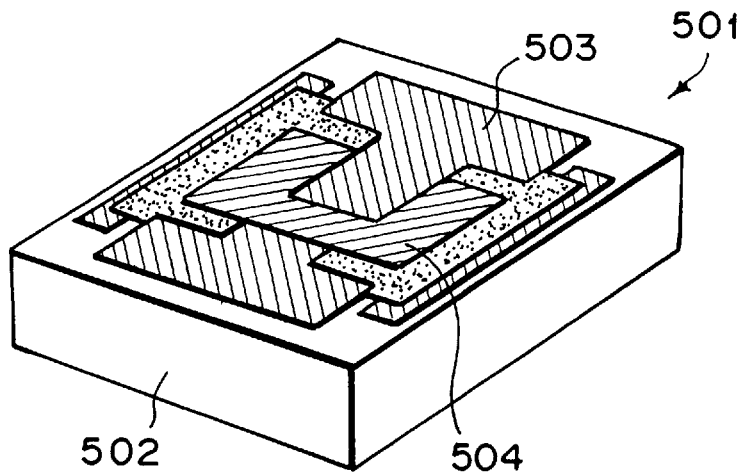
FIG. 31A is a perspective view showing a flow detector of a conventional flow rate sensor.
Figure 31B:
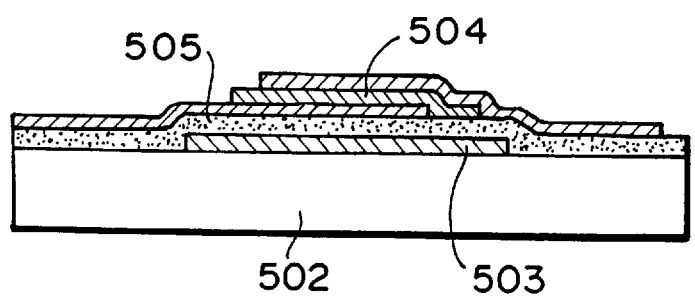
FIG. 31B is a cross-sectional view showing the flow detector of the conventional flow rate sensor.
Figure 32:
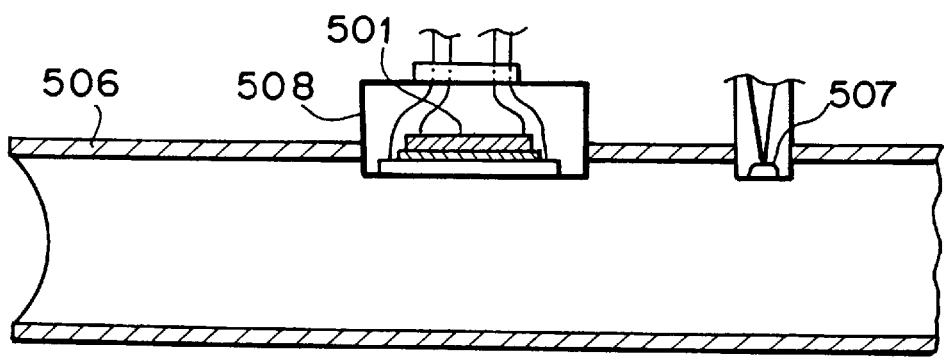
FIG. 32 is a cross-sectional view showing the flow detector of the conventional flow rate sensor attached to a pipe line.

A temperature sensor 431 of the present invention as shown in FIG. 28 may be constructed by replacing only the flow rate detector 402 out of the constituent elements of the flow rate sensor 401 of each embodiment with a temperature detector 432 shown in FIG. 27.

That is, the temperature detector 432 is formed by directly and successively laminating an insulating layer 434, a thin-film temperature sensing element 435 and an insulating layer 436 on the top surface of a substrate 433, and the shapes and materials of the substrate 433, the insulating layers 434, 436 and the temperature sensing element 435 are the same as the flow rate detector 402.

As not shown, the temperature detector 432 is fixed to the end portion of the fin plate 403, the fin plate 403 and the output terminal 404 are disposed in the housing main body 415, 419 having the hollow recess portion 417, 421, and the temperature detector 432 and the output terminal 404 are connected to each other by a bonding wire 418. Further, the lid 416, 420, 422 is fitted to the housing main body to hermetically close the hollow recess portion 417, 421 and form the cavity portion in the housing 405, thereby obtaining the temperature sensor 431 having the surrounding of the temperature detector 432 as an air layer.

As in the case of the flow rate sensor 401, in the temperature sensor 431 thus formed, the temperature detector 432 is accommodated in the cavity portion of the housing 405, the air layer having a high adiabatic effect is formed between the surrounding of the temperature detector 432 and the inner peripheral surface of the housing 405, and the surface portion of the fin plate 403 and the output terminal (containing the connection portions thereof with the temperature detector 432) are exposed to the hollow recess portion. Therefore, the effect on the flow-in/out of the quantity of heat is reduced through the housing 405 and the measurement error affecting this quantity of heat is reduced, so that the measurement precision of the temperature of the fluid can be enhanced.

If the notch portion 419d is provided at the outer peripheral surface portion of the housing main body 415,419, the portion of the notch portion 419d serves as the void portion to suppress the flow of heat into/out of the housing main body 415, 419, thereby suppressing the measurement error effected by undesired quantity of temperature.

The flow rate sensor 401 and the temperature sensor 431 of the present invention have common constituent elements, and can be manufactured by various methods. Specifically, the constituent elements such as the fin plate 403, etc. are mounted in the housing main body 415, 419 which is separately formed from the above elements, and then the lid 416, 420, 422 is mounted on the housing main body 415, 419, or the constituent elements to be fitted to the housing main body are integrally installed into the housing main body when the housing main body is formed, and then the lid is mounted on the housing main body.

In the flow rate sensor 401 and the temperature sensor 431 of the present invention, the cavity portion is provided in the housing 405 and the flow rate detector 402 or the temperature detector 432 is accommodated in the cavity portion so that the surface of each detector is exposed to the air layer in the cavity portion, whereby the heat transfer from the housing 405 can be prevented and the flow of the quantity of heat into/out of the outside can be suppressed.

Accordingly, if there is adopted such a structure that the flow rate detector 402 or the temperature detector 432 is accommodated in the cavity portion which is provided in the sensor, any form may be applied to the housing 405. In the above embodiments, the housing main body and the lid are designed to be separate from each other for the viewpoint of the convenience of the manufacturing. However, another separate structure or an integral structure of these elements with the respective constituent elements may be adopted.

The flow rate sensor 401 and the temperature sensor 431 thus constructed are fitted into a casing 452 shown in FIGS. 28 and 29 to construct a flow rate detecting apparatus 451, which will be used to measure the flow rate.

The casing 452 is formed of synthetic resin such as vinyl chloride resin, PBT, PPS or the like, and it comprises a main body portion 455 and a lid portion 456 which is detachably mounted on the main body portion 455. Both the end portions of the main body portion 455 are set as connection portions 457 to be connected to external pipes, and a flow passage pipe 453 is disposed so as to penetrate through the main body portion 455.

A sensor insertion space 458 is formed at the upper portion of the main body portion 455, and sensor insertion holes 459 and 460 are formed so as to extend from the sensor insertion space toward the flow passage pipe 453.

The flow passage pipe 453 is a metal cylindrical pipe formed of copper, iron, stainless steel or the like, and opening portions 461, 462 are formed in the flow passage pipe 453 so as to face the sensor insertion holes 459, 460.

The flow rate sensor 401 and the temperature sensor 431 are fitted from the sensor insertion space of the casing 452 into the sensor insertion holes 459, 460. The lower half portions of the fin plates 403 are inserted through the opening portions 461, 462 of the flow passage pipe 453 and located in the pipe. When these sensors 401 and 431 are fitted in the sensor insertion holes 459 and 460 respectively, the lower ends of the fin plates 403 extend to positions lower than the central axial line of the flow passage pipe 453.

O-rings 463, 464 are interposed between the flow rate sensor 401 and the sensor insertion hole 459 and between the temperature sensor 431 and the sensor insertion hole 460 to prevent fluid from leaking through the gaps therebetween.

After the flow rate sensor 401 and the temperature sensor 431 are fitted, a sensor press plate 465 is inserted into the sensor insertion space 458 to press the top surface of the housings 405 of the sensors, and a flow rate, etc. detecting circuit board 454 is mounted thereon.

The flow rate, etc. detecting circuit board 454 is electrically connected to the respective output terminals 404 of the flow rate sensor 401 and the temperature sensor 431, and the flow rate detecting circuit described with reference to FIG. 10 is constructed as a whole.

Specifically, there is constructed a bridge circuit containing the temperature sensing resistor 407 of the flow rate detector 402, the temperature sensing element 435 of the temperature detector 432 and a variable resistor. A constant voltage is applied to the bridge circuit by a constant-voltage circuit, and the output of the bridge circuit is input through a differential amplifying circuit having an amplification factor adjusting resistor and an integration circuit to the base terminal of a collector-grounded transistor having an emitter terminal which is connected to the heating element 409 of the flow rate detector 402. The potential of the heating element 409 which varies in accordance with the potential difference between a,b points of the bridge circuit is picked up as a detection signal for the flow rate.

That is, when the detection temperature of the fluid by the temperature sensing resistor 407 is lowered, the base current value of the transistor is controlled on the basis of the signal from the integrated circuit so as to increase the heating value of the heating element 409, in other words, so as to increase the supply power to the heating element. On the other hand, when the detection temperature of the fluid by the temperature sensing resistor 407 is increased, the base current value of the transistor is controlled on the basis of the signal from the integrated circuit so as to reduce the heating value of the heating element 409, in other words, so as to reduce the supply power to the heating element. Accordingly, irrespective of the flow rate of the fluid to be detected, the temperature compensation of the fluid is carried out so that the flow rate of the fluid can be detected with high precision.

[EXAMPLE]

A flow rate detecting apparatus having the same construction as the flow rate detecting apparatus 451 described above was constructed by using the flow rate sensor 401 shown in FIGS. 22 and 23, and the flow rate was measured by using the flow rate detecting apparatus thus constructed.

Kerosene was used as fluid to be measured, and a predetermined amount of kerosene was put into the flow passage pipe 453. The amount of kerosene was increased or reduced to a predetermined amount at a time, and the flow rate was continuously measured. Thereafter, the variation of the output variation rate with time lapse from the switch time of the flow rate was determined.

The variation of the output variation rate with time lapse from a time point at which the flow rate was switched from 20 cc/minute to 80 cc/minute is indicated by reference character (A) in FIG. 30. Further, the variation of the output variation rate with time lapse from a time point at which the flow rate was switched from 80 cc/minute to 20 cc/minute is indicated by reference character (B) in FIG. 30.

Here, the output variation rate indicates the ratio of the measured flow rate value to the actual flow rate value of the fluid flowing through the flow passage pipe 453 (i.e., measured flow rate value/actual flow rate value). As the output variation rate approaches to 1.0, it means that the measurement error is smaller.

[COMPARATIVE EXAMPLE]

A flow rate sensor having a conventional structure in which the surrounding of the flow rate detector is covered with no gap by the housing was installed in the apparatus used in the above Example, and the flow rate was measured in the same procedure as described above to determine the output variation rate.

The variation of the output variation rate when the flow rate was switched from 20 cc/minute to 80 cc/minute is indicated by reference character (C) in FIG. 30, and the variation of the output variation rate when the flow rate was switched from 80 cc/minute to 20 cc/minute is indicated by reference character (D) in FIG. 30.

Referring to FIG. 30, with the conventional flow rate sensor, it takes a long time until the measured flow rate value approaches to the actual flow rate value and the output is kept stable (in FIG. 30, 30 seconds or more are needed, and about 2 minutes are needed in the actual measurement). However, with the flow rate sensor of the present invention, the output is kept stable within 5 seconds, and it can follow the variation of the actual flow rate in a short time. Therefore, it has been proved that according to the sensor of the present invention, the sensitivity is excellent, the response is high and the measurement precision is stable and enhanced.

As described above, according to the flow rate sensor and the temperature sensor of the present invention, the effect of the flow-in/out of the quantity of heat between the outside air and the flow rate sensor or the temperature sensor can be reduced, and even when the specific heat of the fluid is small, the flow rate is small or the like, the flow rate and the temperature thereof can be measured with high precision.

[INDUSTRIAL APPLICABILITY]

As described above, according to the flow rate of the present invention, the elements containing the flow rate detector are unified into an unit, and thus the fabrication work in the manufacturing process can be easily performed. Further, according to the flow rate sensor of the present invention, the measurement of the flow rate can be accurately performed without suffering an adverse effect of the variation of the outside air temperature. Still further, according to the flow rate sensor of the present invention, even when the fluid is viscous fluid having relatively high viscosity, the flow rate of the fluid flowing in the pipe can be accurately measured. In addition, according to the present invention, even when the flow rate is relatively small, the flow rate of the fluid flowing in the pipe can be accurately measured.

As described above, according to the flow rate sensor of the present invention, the flow rate detecting base portion for sealing the flow rate detector is formed of synthetic resin having low thermal conductivity, so that the adverse effect of the thermal transfer between the outside environment and the flow rate detector on the flow rate detection can be suppressed. Therefore, the flow rate of fluid to be detected in a pipe line can be accurately and steadily detected.

The present invention can provide the flow rate sensor and the flow rate detecting apparatus which can be easily installed into the casing and mounted in the casing under a stable fixed state with sufficient durability.

Further, according to the flow rate sensor of the present invention, the quantity of heat discharged from each part of the flow rate sensor to the casing and the outside can be extremely reduced, and even when the specific heat of the fluid is small, the flow rate is small or the like, the flow rate can be measured with high precision.

As described above, according to the flow rate sensor and the temperature sensor of the present invention, the effect of the flow-in/out of the quantity of heat between the outside air and the flow rate sensor or the temperature sensor can be suppressed, and thus even when the specific heat of fluid is small, the flow rate is small or the like, the flow rate and the temperature thereof can be measured with high precision.

Reference is made to co-pending U.S. patent application Ser. No. 09/763,290 filed Feb. 20, 2001.

What is claimed is:

1. A flow rate sensor comprising:
   a flow rate detector having a heat function and a temperature sensing function;
   a pipe line for fluid to be detected which is formed so that heat from the flow rate detector is transferred to and absorbed by the fluid, wherein temperature sensing which is affected by a heat absorption effect of the fluid due to the heat is executed in the flow rate detector, and the flow rate of the fluid in the pipe line is detected on the basis of the temperature sensing result;

at least one unit retaining portion formed on a casing in which the pipe line is formed, the unit retaining portion being disposed adjacent to the pipe line; and a flow rate detecting unit retained by the unit retaining portion, wherein the flow rate detecting unit comprises the flow rate detector, a first heat transfer member provided to the flow rate detector, a first electrode terminal electrically connected to the flow rate detector and a first base portion made of synthetic resin, the first base portion is retained by the unit retaining portion, the flow rate detector is sealed within the first base portion, the first heat transfer member extends from the first base portion into the pipe line, and the first electrode terminal extends from the first base portion to the side opposite the pipe line.

2. The flow rate sensor as claimed in claim 1, wherein the casing is made of synthetic resin.

3. The flow rate sensor as claimed in claim 1, wherein the first heat transfer member extends to at least the vicinity of the central portion on the section of the pipe line.

4. The flow rate sensor as claimed in claim 1, wherein the first base portion comprises an inner portion having elasticity and an outer portion disposed around the inner portion.

5. The flow rate sensor as claimed in claim 1, wherein a cavity is formed in a central portion of the first base portion.

6. The flow rate sensor as claimed in claim 1, wherein the first heat transfer member has a plate form, and the flow rate detector is joined to a portion of the first heat transfer member located in the first base portion.

7. The flow rate sensor as claimed in claim 1, wherein a seal member for the pipe line is interposed between the first base member and the casing.

8. The flow rate sensor as claimed in claim 1, wherein a device accommodating portion is formed in the casing at the outside of the unit retaining portion, a wiring board is disposed in the device accommodating portion.

9. The flow rate sensor as claimed in claim 8, wherein the device accommodating portion is covered by a lid portion.

10. The flow rate sensor as claimed in claim 1, wherein the dimension of the first heat transfer member in the direction of fluid flow in the pipe line is larger than the dimension in the direction perpendicular to the direction in which the first heat transfer member extends into the section of the pipe line and perpendicular to the direction of fluid flow in the pipe line.

11. The flow rate sensor as claimed in claim 1, wherein the flow rate detector comprises a thin-film heating element and a flow rate detecting thin-film temperature sensing element disposed so as to be affected by the effect of the heating of the thin-film heating element, the thin-film heating element and the flow rate detecting thin-film temperature sensing element being formed on a first substrate.

12. The flow rate sensor as claimed in claim 11, wherein the first heat transfer member is joined to the first substrate.

13. The flow rate sensor as claimed in claim 11, wherein the thin-film heating element and the flow rate detection thin-film temperature sensing element are laminated on a first insulating layer which is laminated on a first surface of the first substrate.

14. The flow rate sensor as claimed in claim 13, wherein the first heat transfer member is joined to a second surface of the first substrate.

15. The flow rate sensor as claimed in claim 1, further comprising a temperature detecting unit retained by the unit retaining portion other than that for retaining the flow rate detecting unit, the temperature detecting unit including a temperature detector for detecting the temperature of the fluid in the pipe line for compensation when the flow rate of the fluid in the pipe line is detected.

16. The flow rate sensor as claimed in claim 15, wherein the temperature detecting unit comprises said temperature detector, a second heat transfer member provided to the temperature detector, a second electrode terminal electrically connected to the temperature detector and a second base portion made of synthetic resin, the second base portion is retained by the unit retaining portion other than that for retaining the flow rate detecting unit, the second heat transfer member extends from the second base portion into the pipe line, and the second electrode terminal extends from the second base portion to the opposite side to the pipe line.

17. The flow rate sensor as claimed in claim 16, wherein the second heat transfer member extends to at least the vicinity of the central portion on the section of the pipe line.

18. The flow rate sensor as claimed in claim 16, wherein the second base portion comprises an inner portion having elasticity and an outer portion disposed around the inner portion.

19. The flow rate sensor as claimed in claim 16, wherein a cavity is formed in a central portion of the second base portion.

20. The flow rate sensor as claimed in claim 16, wherein the second heat transfer member has a plate form, and the temperature detector is joined to a portion of the second heat transfer member located in the second base portion.

21. The flow rate sensor as claimed in claim 16, wherein a seal member for the pipe line is interposed between the second base member and the casing.

22. The flow rate sensor as claimed in claim 16, wherein the wiring board and the second electrode terminal of the temperature detecting unit are electrically connected to each other.

23. The flow rate sensor as claimed in claim 16, wherein the temperature detector comprises a temperature detection thin-film temperature sensing element on a substrate.

24. The flow rate sensor as claimed in claim 23, wherein the second heat transfer member is joined to the substrate.

25. The flow rate sensor as claimed in claim 23, wherein the temperature detection thin-film temperature sensing element is laminated on an insulating layer which is laminated on a first surface of the substrate.

26. The flow rate sensor as claimed in claim 25, wherein the second heat transfer member is joined to a second surface of the second substrate.

27. The flow rate sensor as claimed in claim 16, wherein the dimension of the second heat transfer member in the direction of fluid flow in the pipe line is larger than the dimension in the direction perpendicular to the direction in which the second heat transfer member extends into the section of the pipe line and perpendicular to the direction of fluid flow in the pipe line.

28. A flow rate detecting unit for use in a flow rate sensor including a flow rate detector having a heating function and a temperature sensing function in which temperature sensing which is affected by a heat absorption effect of fluid due to the heat is executed and the flow rate of the fluid is detected on the basis of the temperature sensing result, the flow rate detecting unit comprising:

the flow rate detector;

a heat transfer member provided to the flow rate detector;

an electrode terminal electrically connected to the flow rate detector; and a base portion made of synthetic resin, wherein the flow rate detector is sealed within the base portion, and the heat transfer member and the electrode terminal extend from the base portion to the sides opposite each other.

29. A fluid temperature detecting unit for use in a flow rate sensor including a flow rate detector having a heating function and a temperature sensing function in which temperature sensing which is affected by a heat absorption effect of fluid due to the heat is executed and the flow rate of the fluid is detected on the basis of the temperature sensing result in order to perform compensation of the flow rate detected due to the temperature of the fluid, the temperature detecting unit comprising:

a temperature detector;

a heat transfer member provided to the temperature detector;

an electrode terminal electrically connected to the temperature detector; and a base portion made of synthetic resin, wherein the temperature detector is sealed within the base portion, and the heat transfer member and the electrode terminal extend from the base portion to the sides opposite each other.

30. A flow rate sensor comprising:

a flow rate detector having a heating function and a temperature sensing function;

a pipe line for fluid to be detected; and a flow rate detection heat transfer member which is disposed so as to be affected by heat from the flow rate detector and extends into the pipe line, wherein the temperature sensing which is affected by a heat absorption effect of the fluid due to the heat transferred by the flow rate detection heat transfer member is executed in the flow rate detector, and the flow rate of the fluid in the pipe line is detected on the basis of the temperature sensing result, and, the flow rate detector and a portion of the flow rate detection heat transfer member thermally connected to the flow rate detector are sealed within a flow rate detection base portion made of synthetic resin having a thermal conductivity of 0.7 W/m K or less.

31. The flow rate sensor as claimed in claim 30, wherein the flow rate detection base portion is made of synthetic resin having a thermal conductivity of 0.4 W/m.K or less.

32. The flow rate sensor as claimed in claim 30, wherein the flow rate detection heat transfer member extends in a radial direction to the pipe line and passes through a central axis of the pipe line.

33. The flow rate sensor as claimed in claim 30, wherein the flow rate detection heat transfer member has a plate form being disposed in the pipe line along the pipe line.

34. The flow rate sensor as claimed in claim 32, wherein the flow rate detector comprises a thin-film heating element and a flow rate detecting thin-film temperature sensing element disposed so as to be affected by the effect of the heating of the thin-film heating element outside the pipe line, the thin-film heating element and the flow rate detecting thin-film temperature sensing element being formed on a first substrate.

35. The flow rate sensor as claimed in claim 34, further comprising heating control means for controlling the heating of the heating element connected to a passage for supplying electric current to the heating element, wherein the heating control means controls the current to be supplied to the heating element on the basis of the temperature sensing result so that the temperature sensing result is coincident with a target value, and the flow rate of the fluid is detected on the basis of the control state of the heating control means.

36. The flow rate sensor as claimed in claim 30, further comprising a fluid temperature detector to perform compensation of the flow rate detected in the flow rate detection, wherein the fluid temperature detector and a fluid temperature detection heat transfer member disposed so as to extend into the pipe line are thermally connected to each other.

37. The flow rate sensor as claimed in claim 36, wherein the fluid temperature detector and a portion of the temperature detection heat transfer member thermally connected to the flow rate detector are sealed within a temperature detection base portion made of synthetic resin having a thermal conductivity of 0.7 W/m.K or less.

38. The flow rate sensor as claimed in claim 37, wherein the temperature detection base portion is made of synthetic resin having a thermal conductivity of 0.4 W/m.K or less.

39. The flow rate sensor as claimed in claim 36, wherein the temperature detection heat transfer member extends in a radial direction of the pipe line and passes through a central axis of the pipe line.

40. The flow rate sensor as claimed in claim 36, wherein the temperature detection heat transfer member has a plate form being disposed in the pipe line along the pipe line.

41. A flow rate sensor comprising:

a flow rate detector having a heat function and a temperature sensing function;

a pipe line for fluid to be detected which is formed so that heat from the flow rate detector is transferred to and absorbed by the fluid, wherein the temperature sensing which is affected by a heat absorption effect of the fluid due to the heat is executed in the flow rate detector, and the flow rate of the fluid in the pipe line is detected on the basis of the temperature sensing result;

at least one unit retaining portion formed on a casing in which the pipe line is formed, the unit retaining portion being disposed adjacent to the pipe line; and a flow rate detecting unit comprising the flow rate detector and retained by the unit retaining portion;

wherein the flow rate detecting unit comprises an inner portion having elasticity and an outer portion disposed around the inner portion.

42. A flow rate sensor comprising:

a flow rate detector having a heat function and a temperature sensing function;

a pipe line for fluid to be detected which is formed so that heat from the flow rate detector is transferred to and absorbed by the fluid, wherein the temperature sensing which is affected by a heat absorption effect of the fluid due to the heat is executed in the flow rate detector, and the flow rate of the fluid in the pipe line is detected on the basis of the temperature sensing result;

at least one unit retaining portion formed on a casing in which the pipe line is formed, the unit retaining portion being disposed adjacent to the pipe line; and a flow rate detecting unit comprising the flow rate detector and retained by the unit retaining portion;

wherein a cavity is formed in a central portion of the flow rate detecting unit.

43. A flow rate sensor comprising:

a flow rate detector having a heat function and a temperature sensing function;

a pipe line for fluid to be detected which is formed so that heat from the flow rate detector is transferred to and absorbed by the fluid, wherein the temperature sensing which is affected by a heat absorption effect of the fluid due to the heat is executed in the flow rate detector, and the flow rate of the fluid in the pipe line is detected on the basis of the temperature sensing result;

at least one unit retaining portion formed on a casing in which the pipe line is formed, the unit retaining portion being disposed adjacent to the pipe line;

a flow rate detecting unit comprising the flow rate detector and retained by the unit retaining portion; and a temperature detecting unit retained by the unit retaining portion other than that for retaining the flow rate detecting unit, the temperature detecting unit including a temperature detector for detecting the temperature of the fluid in the pipe line for compensation when the flow rate of the fluid in the pipe line is detected;

wherein the temperature detecting unit comprises said temperature detector, a second heat transfer member provided to the temperature detector, a second electrode terminal electrically connected to the temperature detector and a second base portion made of synthetic resin, the second base portion is retained by the unit retaining portion other than that for retaining the flow rate detecting unit, the second heat transfer member extends from the second base portion into the pipe line, the second electrode terminal extends from the second base portion to the opposite side to the pipe line, and the second base portion comprises an inner portion having elasticity and an outer portion disposed around the inner portion.

44. A flow rate sensor comprising:

a flow rate detector having a heat function and a temperature sensing function;

a pipe line for fluid to be detected which is formed so that heat from the flow rate detector is transferred to and absorbed by the fluid, wherein the temperature sensing which is affected by a heat absorption effect of the fluid due to the heat is executed in the flow rate detector, and the flow rate of the fluid in the pipe line is detected on the basis of the temperature sensing result;

at least one unit retaining portion formed on a casing in which the pipe line is formed, the unit retaining portion being disposed adjacent to the pipe line;

a flow rate detecting unit comprising the flow rate detector and retained by the unit retaining portion;

a temperature detecting unit retained by the unit retaining portion other than that for retaining the flow rate detecting unit, the temperature detecting unit including a temperature detector for detecting the temperature of the fluid in the pipe line for compensation when the flow rate of the fluid in the pipe line is detected;

wherein the temperature detecting unit comprises said temperature detector, a second heat transfer member provided to the temperature detector, a second electrode terminal electrically connected to the temperature detector and a second base portion made of synthetic resin, the second base portion is retained by the unit retaining portion other than that for retaining the flow rate detecting unit, the second heat transfer member extends from the second base portion into the pipe line, the second electrode terminal extends from the second base portion to the opposite side to the pipe line, and a cavity is formed in a central portion of the second base portion.

45. A flow rate sensor comprising:

a flow rate detector having a heating element and a temperature sensing element formed on a substrate;

a fin plate for transferring heat to fluid to be detected therethrough; and an output terminal for outputting the voltage value corresponding to the flow rate, wherein the flow rate detector, a part of the fin plate and a part of the output terminal are coated by molding, and the fin plate and the output terminal are manufactured by processing a plate to a plate base member and then processing the plate base member to the fin plate and the output terminal.

46. The flow rate sensor as claimed in claim 45, wherein the plate base member is formed by etching the plate.

47. A flow rate sensor comprising:

a flow rate detector having a heating element and temperature sensing element formed on a substrate;

a fin plate for transferring heat to fluid to be detected therethrough; and an output terminal for outputting a voltage value corresponding to the flow rate;

wherein the flow rate detector, a part of the fin plate to which the flow rate detector is joined, and a part of the output terminal are sealed by molding;

wherein the fin plate and the output terminal are manufactured by processing a plate to a plate base member and then processing the plate base member to the fin plate and the output terminal.

48. The flow rate sensor as claimed in claim 47, wherein the plate base member is formed by etching the plate.

49. A flow rate detecting apparatus comprising:

a flow rate detector having a heating element and temperature sensing element formed on a substrate;

a fin plate for transferring heat to fluid to be detected therethrough;

an output terminal for outputting a voltage value corresponding to the flow rate, wherein the flow rate detector, a part of the fin plate to which the flow rate detector is joined, and a part of the output terminal are sealed by molding;

a casing having a sensor hole for accommodating the flow rate sensor; and a fluid flow passage pipe having an opening disposed at a position corresponding to the sensor hole.

50. The flow rate detecting apparatus as claimed in claim 48, wherein a seal member is interposed between the flow rate sensor and the sensor hole.

51. The flow rate detecting apparatus as claimed in claim 49, further comprising a fluid temperature sensor, wherein a sensor hole for accommodating the temperature sensor is formed in the casing and an opening disposed at a position corresponding to the sensor hole for accommodating the temperature sensor in the fluid flow passage pipe.

52. The flow rate detecting apparatus as claimed in claim 51, wherein a seal member is interposed between the temperature sensor and the sensor hole for accommodating the temperature sensor.

53. A flow rate sensor comprising:

a flow rate detector having a heating element and temperature sensing element formed on a substrate;

a fin plate for transferring heat to fluid to be detected therethrough; and an output terminal for outputting a voltage value corresponding to the flow rate, wherein the flow rate detector, a part of the fin plate to which the flow rate detector is joined, and a part of the output terminal are sealed by molding;

wherein a recess portion is formed in the substrate, and an air layer is formed in the recess portion sealed by a glass plate.

54. The flow rate sensor as claimed in claim 53, wherein the recess portion is formed by etching.

55. The flow rate sensor as claimed in claim 53, further comprising a fin plate performing heat transmission to the fluid, wherein the flow rate detector is fixed to a surface of an end portion of the fin plate so that a side of the flow rate detector on which the heating element and the temperature sensing element is positioned confront the surface of the end portion of the fin plate.

* * * * *